US011126296B2

(12) United States Patent
Sasaki et al.

(10) Patent No.: US 11,126,296 B2
(45) Date of Patent: Sep. 21, 2021

(54) OPERATION INPUT DEVICE WITH ENHANCED TOUCH POINT DETECTION WITH A DISPLAY DEVICE

(71) Applicant: MITSUBISHI ELECTRIC CORPORATION, Tokyo (JP)

(72) Inventors: Yuichi Sasaki, Tokyo (JP); Yuki Furumoto, Tokyo (JP); Kimika Ikegami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/839,786

(22) Filed: Apr. 3, 2020

(65) Prior Publication Data

US 2020/0233521 A1    Jul. 23, 2020

Related U.S. Application Data

(63) Continuation of application No. PCT/JP2017/036777, filed on Oct. 11, 2017.

(51) Int. Cl.
*G06F 3/041* (2006.01)
*G06F 3/044* (2006.01)
*G06F 3/0488* (2013.01)

(52) U.S. Cl.
CPC ............ *G06F 3/0416* (2013.01); *G06F 3/044* (2013.01); *G06F 3/0488* (2013.01); *G06F 2203/04104* (2013.01)

(58) Field of Classification Search
CPC ...... G06F 3/0416; G06F 3/044; G06F 3/0488; G06F 2203/04104; G06F 3/0393
See application file for complete search history.

(56) References Cited

U.S. PATENT DOCUMENTS

| 5,936,613 A | * | 8/1999 | Jaeger | G06F 3/0238 345/172 |
|---|---|---|---|---|
| 9,688,146 B2 | * | 6/2017 | Kim | B60K 37/04 |
| 10,191,569 B2 | * | 1/2019 | Uno | G06F 3/0416 |
| 2005/0270276 A1 | | 12/2005 | Sugimoto et al. | |

(Continued)

FOREIGN PATENT DOCUMENTS

DE    10 2015 118 587 A1    5/2017
DE    11 2015 006 440 T5    12/2017

(Continued)

OTHER PUBLICATIONS

International Search Report for PCT/JP2017/036777 dated Nov. 21, 2017.

(Continued)

*Primary Examiner* — David D Davis
(74) *Attorney, Agent, or Firm* — Birch, Stewart, Kolasch & Birch, LLP

(57) ABSTRACT

An operation input device includes a knob disposed in a display region of a touch display, and a conductor column provided in the knob that can be detected as a touch point irrespective of whether or not the knob is in a state of being touched with a user's finger. The operation input device detects a plurality of touch points including the touch point corresponding to the conductor column and outputs touch information related to the plurality of detected touch points, determines the touch point corresponding to the conductor column among the detected plurality of touch points, calculates a touch strength value at the touch point corresponding to the conductor column, and determines whether or not the knob is in a state of being touched with the user's finger based on the touch strength value.

14 Claims, 17 Drawing Sheets

(56) References Cited

U.S. PATENT DOCUMENTS

| | | |
|---|---|---|
| 2009/0207148 A1 | 8/2009 | Sugimoto et al. |
| 2013/0100042 A1 | 4/2013 | Kincaid |
| 2014/0002417 A1* | 1/2014 | Yoshida ............... A63F 13/213 345/174 |
| 2014/0062934 A1 | 3/2014 | Coulson et al. |
| 2014/0350784 A1* | 11/2014 | Imai ................... G06F 3/041 701/36 |
| 2015/0084886 A1* | 3/2015 | Kamiyama ......... G06F 3/03548 345/173 |
| 2017/0153718 A1* | 6/2017 | Brown ................. G06F 3/0362 |
| 2017/0220198 A1 | 8/2017 | Sugahara |
| 2018/0011556 A1* | 1/2018 | Minyu ................. G06F 3/0487 |
| 2018/0024649 A1* | 1/2018 | Uno ..................... G06F 3/0416 345/174 |
| 2018/0154774 A1* | 6/2018 | Park ..................... G06F 1/1654 |
| 2018/0314357 A1 | 11/2018 | Klein et al. |

FOREIGN PATENT DOCUMENTS

| | | | | |
|---|---|---|---|---|
| FR | 3041445 A1 * | 3/2017 | ............ | G06F 3/0485 |
| JP | 2005-346507 A | 12/2005 | | |
| JP | 2010-257077 A | 11/2010 | | |
| JP | 2012-35782 A | 2/2012 | | |
| JP | 2013-178678 A | 9/2013 | | |
| JP | 5705767 B2 | 4/2015 | | |
| JP | 2017-59201 A | 3/2017 | | |
| JP | 2017-138759 A | 8/2017 | | |
| WO | WO 2012/070593 A1 | 5/2012 | | |
| WO | WO 2015/064488 A1 | 5/2015 | | |
| WO | WO 2016/166793 A1 | 10/2016 | | |
| WO | WO-2016166793 A1 * | 10/2016 | ............. | G06F 3/038 |
| WO | WO-2017168010 A1 * | 10/2017 | ............. | B60K 35/00 |

OTHER PUBLICATIONS

Office Action for Japanese Patent Application No. 2018-506229 dated Apr. 3, 2018.

German Office Action for German Application No. 11 2017 007 920.9, dated Feb. 2, 2021, with English translation.

* cited by examiner

FIG. 12

| Possible Touch Coordinate Values of Touch Point Corresponding To Conductor Column In State In Which Knob Is Not Being Touched With User's Finger | | Estimated Values of Amounts of Changes In Touch Coordinate Values Shown On Left, that Occur When Knob Is Touched With User's Finger | |
|---|---|---|---|
| Touch Coordinate Value In X-Axis Direction | Touch Coordinate Value In Y-Axis Direction | Estimated Value of Amount of Change In X-Axis Direction | Estimated Value of Amount of Change In Y-Axis Direction |
| X0 | Y0 | $\Delta$X00 | $\Delta$Y00 |
| X0 | Y1 | $\Delta$X01 | $\Delta$Y01 |
| ⋮ | ⋮ | ⋮ | ⋮ |
| X0 | Ym | $\Delta$X0m | $\Delta$X0m |
| ⋮ | ⋮ | ⋮ | ⋮ |
| Xn | Y0 | $\Delta$Xn0 | $\Delta$Yn0 |
| Xn | Y1 | $\Delta$Xn1 | $\Delta$Xn1 |
| ⋮ | ⋮ | ⋮ | ⋮ |
| Xn | Ym | $\Delta$Xnm | $\Delta$Xnm |

OPERATION INPUT DEVICE WITH ENHANCED TOUCH POINT DETECTION WITH A DISPLAY DEVICE

CROSS REFERENCE TO RELATED APPLICATIONS

This application is a Continuation of PCT International Application No. PCT/JP2017/036777, filed on Oct. 11, 2017, which is hereby expressly incorporated by reference into the present application.

TECHNICAL FIELD

The present invention relates to an operation input device.

BACKGROUND ART

Conventionally, a so-called "knob-on-touch-display" is used as an operation input device for an electronic device such as an in-vehicle information device. The knob-on-touch-display includes a dial-like member (hereinafter, referred to as "knob") disposed in a region of a display surface of a touch display in which images can be displayed (hereinafter, referred to as "display region"). The knob is provided so as to be rotatable with respect to the display surface of the touch display, or it is provided so as to be slidable over the display surface of the touch display. By a user touching the display surface of the touch display with his/her fingers or rotating or sliding the knob with an image for operations being displayed on the touch display, requests for performing various types of control assigned to these operations (hereinafter, referred to as "events") are inputted to the electronic device. Patent Literature 1 discloses a knob-on-touch-display that uses a capacitive type touch display.

CITATION LIST

Patent Literatures

Patent Literature 1: JP 2013-178678 A

SUMMARY OF INVENTION

Technical Problem

In general, by comparing a capacitance value detected by a touch sensor with a threshold value, a touch display based on the capacitive sensing method detects a point with which a user's finger is in contact. In other words, in a state in which a display surface of the touch display is being touched with user's finger, a human body functions as electrical grounding (hereinafter, referred to as "GND"), and therefore a capacitance value at the point with which the user's finger is in contact becomes larger than a capacitance value at other points. Accordingly, by setting a threshold value corresponding to a value between the capacitance value at the point with which the user's finger is in contact and the capacitance value at other points, a point with which a user's finger is in contact can be detected.

A knob in the knob-on-touch-display disclosed in Patent Literature 1 includes a plurality of substantially columnar conductors (hereinafter, referred to as "conductor columns"). In a state in which the knob is being touched with user's finger, an electric potential of the conductor column becomes a value equivalent to the electric potential of GND, and thus points at which the conductor columns are arranged can be detected by a principle similar to the principle for detecting a point with which a user's finger is in contact. Hereinafter, points that become detection targets in the knob-on-touch-display, in other words, a point corresponding to a user's finger, and points corresponding to the conductor columns in the knob, are generically called "touch points".

However, in a state in which the knob is being touched with user's finger, electric potentials of the conductor columns do not become a value equivalent to the electric potential of GND, and therefore touch points corresponding to the conductor columns cannot be detected by the above-described principle. Therefore, there arises a problem that in a state in which the knob is being touched with user's finger, a position of the knob cannot be detected, and consequently a position of an image displayed on the touch display easily deviates from the position of the knob.

Meanwhile, by increasing the area of the base of each individual conductor column, or by increasing the number of conductor columns that are electrically continuous to one another, a capacitance value of a touch point corresponding to each individual conductor column can be increased. Consequently, even in a state in which the knob is being touched with user's finger, touch points corresponding to the conductor columns can be detected by the above-described principle.

However, in this case, the conductor columns are detected as touch points irrespective of whether or not the knob is in a state of being touched with user's finger, and therefore it becomes difficult to determine whether or not the knob is in a state of being touched with user's finger. As the result, it also becomes difficult to detect that the knob is touched with user's finger, and that the user's finger has moved away from the knob. Thus, there arises a problem that these detection results cannot be processed as events.

In other words, the knob-on-touch-display in the prior art has a problem that it is not possible to cope with both of processing of detecting conductor columns as touch points in a state in which the knob is being touched with user's finger and processing of determining whether or not the knob is in a state of being touched with user's finger, and accordingly only either one of these pieces of processing can be implemented.

The present invention has been made to solve the problems such as those described above, and an object of the present invention is to provide a knob-on-touch-display that is capable of detecting conductor columns as touch points irrespective of whether or not the knob is in a state of being touched with user's finger, and that is capable of determining whether or not the knob is in a state of being touched with user's finger.

Solution to Problem

An operation input device according to the present invention is provided with: a knob for operations, disposed in a display region of a touch display; conductor columns that are provided in the knob, and each of which can be detected as a touch point irrespective of whether or not the knob is in a state of being touched with user's finger; a touch point detecting unit for detecting a plurality of touch points including the touch points corresponding to the conductor columns, and outputting touch information related to the plurality of detected touch points; a knob touch point determining unit for determining, by using the touch information, the touch points corresponding to the conductor columns among the plurality of touch points detected by the touch point detecting unit; a touch strength value calculating unit for calculating a touch strength value on a basis of touch information of the touch points corresponding to the conductor columns by using the touch information and the determination result by the knob touch point determining unit; and a finger-touch-on-the-knob determining unit for determining, by using the touch strength value, whether or not the knob is in a state of being touched with user's finger.

Alternatively, an operation input device according to the present invention is provided with: a knob for operations, disposed in a display region of a touch display; a conductor column that is provided in the knob, and that can be detected as a touch point irrespective of whether or not the knob is in a state of being touched with user's finger; a touch point detecting unit for detecting a plurality of touch points including the touch point corresponding to the conductor column, and outputting touch information related to the plurality of detected touch points; a knob touch point determining unit for determining, by using the touch information, the touch point corresponding to the conductor column among the plurality of touch points detected by the touch point detecting unit; a touch strength value calculating unit for calculating a touch strength value at the touch point corresponding to the conductor column by using the touch information and a determination result by the knob touch point determining unit; a touch coordinate value obtaining unit for obtaining touch coordinate values of the touch point corresponding to the conductor column by using the touch information and the determination result by the knob touch point determining unit; a knob operation determining unit for determining, on a basis of changes in the touch coordinate values with respect to time, whether or not the knob is in a state of being operated; a finger-touch-on-the-knob determining unit for determining, by executing threshold-value determination processing in which the touch strength value is used, whether or not the knob is in a state of being touched with user's finger; and a threshold value setting unit for setting a threshold value in the threshold-value determination processing by using the touch strength value obtained in the state in which the knob is being operated.

Alternatively, an operation input device according to the present invention is provided with: a knob for operations, disposed in a display region of a touch display; a conductor column provided in the knob, and each including a first conductor column that can be detected as a touch point irrespective of whether or not the knob is in a state of being touched with user's finger, and a second conductor column that can be detected as a touch point only in the state in which the knob is being touched with user's finger; a touch point detecting unit for detecting a plurality of touch points including the touch point corresponding to the conductor column, and outputting touch information related to the plurality of detected touch points; a knob touch point determining unit for determining, by using the touch information, the touch point corresponding to the conductor column among the plurality of touch points detected by the touch point detecting unit; and a finger-touch-on-the-knob determining unit for determining, on a basis of the number of touch points included in the determination result by the knob touch point determining unit, whether or not the knob is in a state of being touched with user's finger.

Advantageous Effects of Invention

According to the present invention, since the knob-on-touch-display is configured as described above, the knob-on-touch-display is capable of detecting a conductor column as touch points irrespective of whether or not the knob is in a state of being touched with user's finger, and at the same time, is capable of determining whether or not the knob is in a state of being touched with user's finger.

BRIEF DESCRIPTION OF DRAWINGS

FIG. 12 is an explanatory drawing illustrating an example of a data table stored in a memory.

DESCRIPTION OF EMBODIMENTS

In order to describe the present invention in further detail, embodiments for carrying out the present invention will be described below with reference to the accompanying drawings.

First Embodiment

Figure 1:
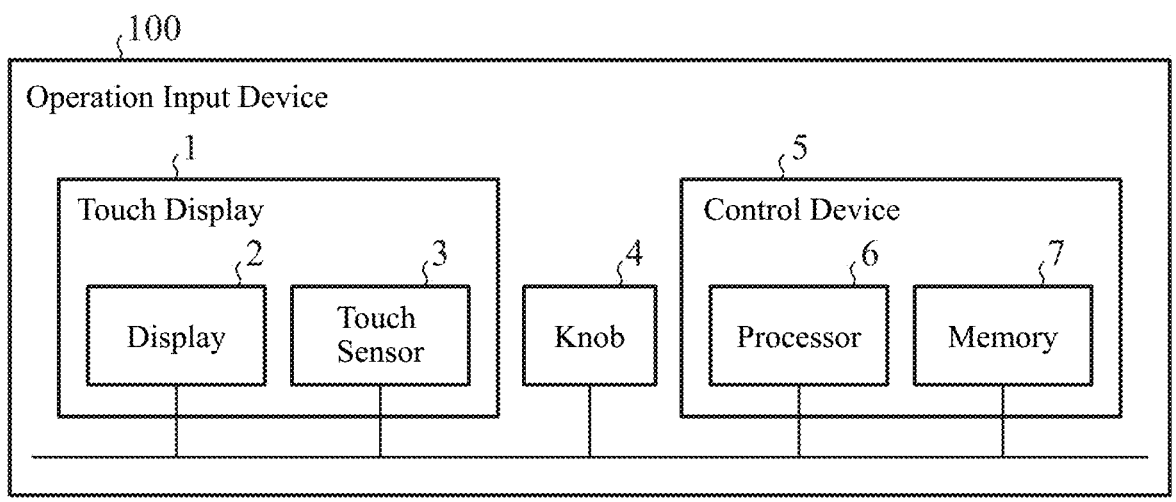
FIG. 1 is a block diagram illustrating a hardware configuration of an operation input device according to a first embodiment of the present invention.
Figure 2A:
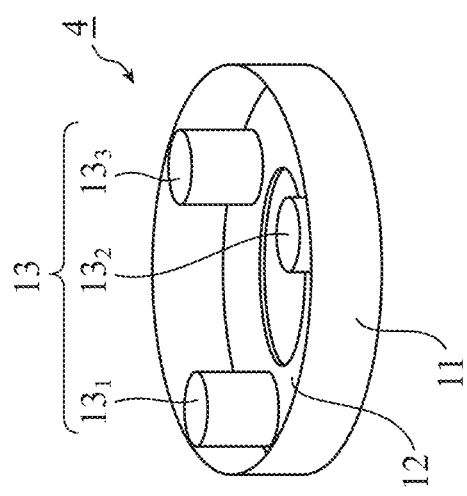
FIG. 2A is a perspective view illustrating an essential part of a knob according to the first embodiment of the present invention.
Figure 2B:
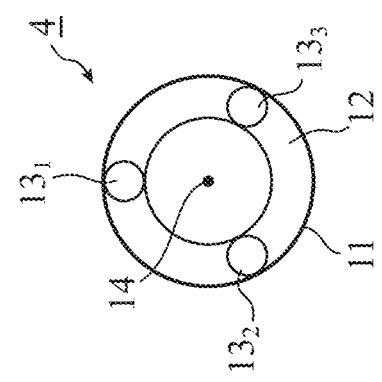
FIG. 2B is a plan view illustrating the essential part of the knob according to the first embodiment of the present invention.
Figure 2C:
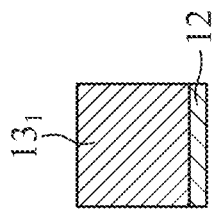
FIG. 2C is a cross-sectional view illustrating a state in which one conductor column and a part of a bottom plate in the knob are viewed from the side according to the first embodiment of the present invention.
Figure 3:
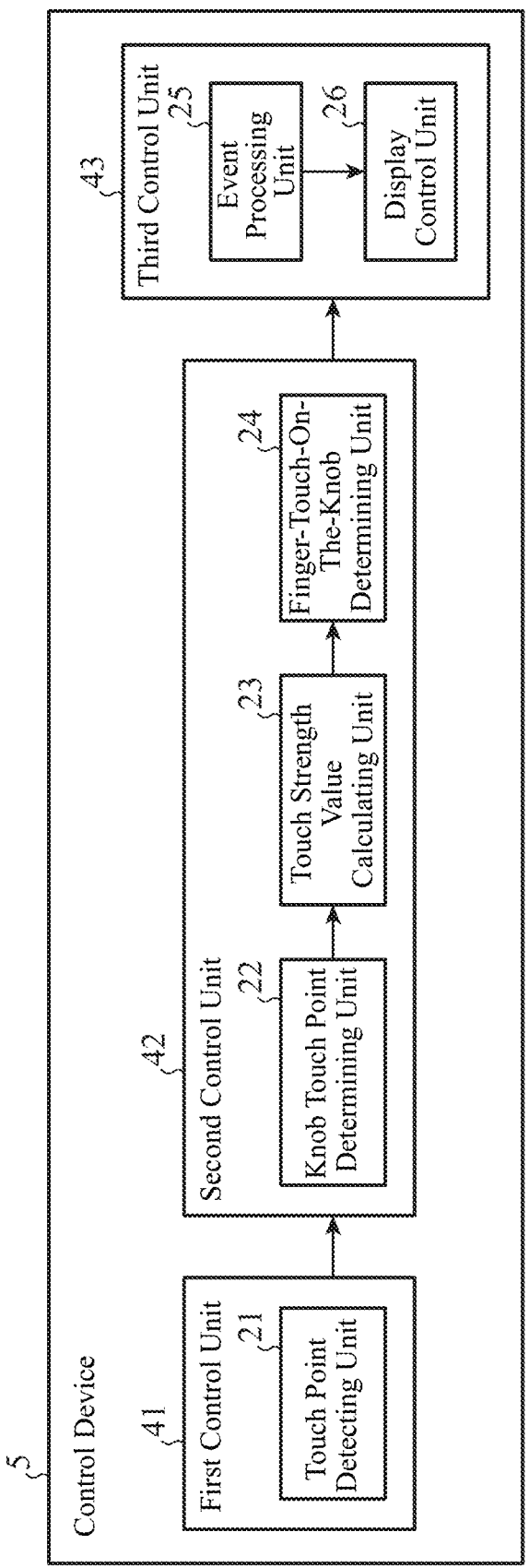
FIG. 3 is a block diagram illustrating an essential part of a control device according to the first embodiment of the present invention.

FIG. 1 is a block diagram illustrating a hardware configuration of an operation input device according to a first embodiment. FIG. 2A is a perspective view illustrating an essential part of a knob according to the first embodiment. FIG. 2B is a plan view illustrating the essential part of the knob according to the first embodiment. FIG. 2C is a cross-sectional view illustrating a state in which one conductor column and a part of a bottom plate in the knob are viewed from the side according to the first embodiment. FIG. 3 is a block diagram illustrating an essential part of a control device according to the first embodiment. An operation input device 100 according to the first embodiment will be described with reference to FIGS. 1 to 3.

As shown in FIG. 1, the operation input device 100 includes a touch display 1. The touch display 1 includes a display 2, and a touch sensor 3. The display 2 includes, for example, a liquid crystal display or an organic electro luminescence (EL) display. The touch sensor 3 includes, for example, a plurality of electrode patterns that are arranged so as to extend along a display surface of the display 2. In other words, the touch display 1 is based on a capacitive sensing method. It should be noted that the touch sensor 3 may be a sensor based on a self-capacitance method or may be a sensor based on a mutual capacitance method.

As shown in FIG. 1, the operation input device 100 includes a knob 4. The knob 4 is disposed at an arbitrary position in a display region of the touch display 1. The knob 4 is pivotably placed or mounted with respect to the display surface of the touch display 1, or it is slidably placed or mounted with respect to the display surface of the touch display 1. It should be noted that the knob 4 may be attachable/detachable to/from the touch display 1 or a position of the knob 4 in a display region may be changeable by attaching/detaching the knob 4.

The knob 4 includes a conductive portion (hereinafter, referred to as "grasping conductive portion") that can be touched by a finger of a user when the user grasps the knob 4. In the example shown in FIG. 2, the grasping conductive portion includes a substantially cylindrical outer peripheral conductive portion 11. The outer peripheral conductive portion 11 is made of a conductor or is made of resin plated with a conductive material. One of two openings in the outer peripheral conductive portion 11 is provided with a substantially disk-like bottom plate 12 made of resin.

The knob 4 is vertically provided with respect to the bottom plate 12, and at the same time, includes one or more conductor columns 13 housed in the outer peripheral conductive portion 11. In the example shown in FIG. 2, three conductor columns $13_1$ to $13_3$ are arranged at positions corresponding to respective vertexes of an equilateral triangle. Each of the conductor columns $13_1$ to $13_3$ is electrically continuous to the outer peripheral conductive portion 11, and at the same time, has the area of the base that is large enough to be detected as a touch point irrespective of whether or not the grasping conductive portion is in a state of being touched with user's finger. Bottom surface portions of the respective conductor columns $13_1$ to $13_3$ are arranged so as to face the display surface of the touch display 1 through the bottom plate 12.

It should be noted that the grasping conductive portion may include a substantially disk-like conductive lid body (not illustrated) with which the other of the two openings in the outer peripheral conductive portion 11 is provided. In other words, the knob 4 has a substantially annular outer shape, and is provided with a substantially columnar hollow portion 14 so as to extend along the axial center of the knob 4.

As shown in FIG. 1, the operation input device 100 includes a control device 5. The control device 5 includes a processor 6, and a memory 7. The memory 7 stores a program for implementing functions of a touch point detecting unit 21, a knob touch point determining unit 22, a touch strength value calculating unit 23, a finger-touch-on-the-knob determining unit 24, an event processing unit 25 and a display control unit 26 shown in FIG. 3. The processor 6 reads the program stored in the memory 7, then executes the program, thereby implementing the functions of the touch point detecting unit 21, the knob touch point determining unit 22, the touch strength value calculating unit 23, the finger-touch-on-the-knob determining unit 24, the event processing unit 25 and the display control unit 26.

As the processor 6, for example, a central processing unit (CPU), a graphics processing unit (GPU), a microprocessor, a microcontroller, a digital signal processor (DSP) or the like is used. As the memory 7, for example, a semiconductor memory such as a random-access memory (RAM), a read only memory (ROM), a flash memory, an erasable programmable read only memory (EPROM) or an electrically erasable programmable read-only memory (EEPROM) is used, or a magnetic disk, an optical disk, a magneto-optical disk or the like is used.

An essential part of the control device 5 will be described below with reference to FIG. 3.

The touch point detecting unit 21 detects a touch point by using a signal output from the touch sensor 3. Specifically, for example, the touch point detecting unit 21 detects a plurality of touch points by executing threshold-value determination processing in which a capacitance value indicated by a signal output from the touch sensor 3 is used. The touch point detecting unit 21 outputs information (hereinafter, referred to as "touch information") related to the plurality of touch points that have been detected.

The touch information includes at least information indicating a capacitance value of each touch point, and information indicating coordinate values (hereinafter, referred to as "touch coordinate values") of each touch point. In addition to this, the touch information may include information indicating the area of each touch point, and information indicating a load placed on each touch point. In addition, the touch information may include: an identification number indicating, in a case where each touch point corresponds to a user's finger, a kind of the finger; and information indicating, in a case where each touch point corresponds to a user's finger, a contact state of the finger.

The knob touch point determining unit 22 determines touch points corresponding to the conductor columns 13 among the plurality of touch points detected by the touch point detecting unit 21.

Specifically, for example, in the knob touch point determining unit 22, value ranges based on a distance between every two touch points±a predetermined allowable error are preset, the two touch points being selected from among three touch points corresponding to the respective three conductor column $13_1$ to $13_3$. The knob touch point determining unit 22 executes the following processing for each combination of three touch points selected from among the plurality of touch points detected by the touch point detecting unit 21.

In other words, by using touch coordinate values of each of the three selected touch points indicated by the touch information, the knob touch point determining unit 22 determines whether or not the three selected touch points are arranged at positions corresponding to respective vertexes of an equilateral triangle. In a case where the three selected touch points are arranged at the positions corresponding to the respective vertexes of the equilateral triangle, the knob touch point determining unit 22 determines whether or not a distance between every two touch points among the three selected touch points is a value that falls within the preset range. In a case where the distance between every two touch points is a value that falls within the range, the knob touch point determining unit 22 determines that the three selected touch points are touch points corresponding to the respective conductor columns $13_1$ to $13_3$. It should be noted that when the knob touch point determining unit 22 selects any three touch points, the knob touch point determining unit 22 may exclude, from targets to be selected, a touch point at which a capacitance value is lower than a predetermined value.

It should be noted that in a case where the knob 4 has an attachable/detachable structure, when the knob 4 is being removed from the touch display 1, there is a possibility that touch points corresponding to the conductor columns 13 will not be included in the detection result by the touch point detecting unit 21. In this case, it is determined, by the knob touch point determining unit 22, that touch points corresponding to the conductor columns 13 do not exist.

By using touch information output from the touch point detecting unit 21, the touch strength value calculating unit 23 calculates a value (hereinafter, referred to as "touch strength value") indicating a touch strength at a touch point that has been determined to be each of the touch points corresponding to the conductor columns 13 by the knob touch point determining unit 22.

More specifically, the touch information includes information indicating capacitance values at the respective touch points that have been determined to be the touch points corresponding to the respective conductor columns 13 by the knob touch point determining unit 22. The touch strength value calculating unit 23 calculates touch strength values by using these capacitance values. A specific example of a method for calculating touch strength values by using capacitance values will be described later with reference to FIGS. 5 and 6.

It should be noted that the touch information may include information indicating the area of each of the respective touch points that have been determined to be the touch points corresponding to the respective conductor columns 13 by the knob touch point determining unit 22; or information indicating a load placed on each of these touch points. In this case, the touch strength value calculating unit 23 may calculate touch strength values by using these pieces of information.

By using the touch strength values detected by the touch strength value calculating unit 23, the finger-touch-on-the-knob determining unit 24 determines whether or not the knob 4 is in a state of being touched with user's finger. In addition, by using the determination result, the finger-touch-on-the-knob determining unit 24 detects that a user's finger has come in contact with the knob 4, and that the user's finger has moved away from the knob 4. Specific examples of the determination method and the detection method by the finger-touch-on-the-knob determining unit 24 will be described later with reference to FIGS. 5 and 6.

The event processing unit 25 processes the detection result by the finger-touch-on-the-knob determining unit 24 as an event. In other words, when the finger-touch-on-the-knob determining unit 24 has detected that a user's finger has come in contact with the knob 4, the event processing unit 25 executes predetermined control or instructs each functional part in the control device 5 to execute the predetermined control. In addition, when the finger-touch-on-the-knob determining unit 24 has detected that the user's finger has moved away from the knob 4, the event processing unit 25 executes predetermined control, or instructs each functional part in the control device 5 to execute the predetermined control.

The display control unit 26 executes control for causing the touch display 1 to display an operation image or the like. Usually, operation input by the operation input device 100 is executed in a state in which an operation image is displayed on the touch display 1. Here, since the knob 4 has a substantially annular outer shape, the operation image can be displayed not only in a display region around the knob 4, but also in a display region inside the hollow portion 14.

Incidentally, in a case where the operation input device 100 is applied to an in-vehicle information device, the display control unit 26 may control not only image displaying by the touch display 1, but also image displaying by a head-up display (HUD) (not illustrated) provided in a vehicle. More specifically, the display control unit 26 may have a function of causing an image indicating a kind or contents of control executed by turning operation of turning the knob 4 or slide operation of sliding the knob 4 to be displayed on the HUD. In this case, when the finger-touch-on-the-knob determining unit 24 has detected that a user's finger has come in contact with the knob 4, the event processing unit 25 may instruct the display control unit 26 to execute the control for causing the image to be displayed on the HUD display. By bringing a finger into contact with the knob 4, the user is capable of visually recognizing a kind or contents of control executed by turning operation of turning the knob 4 or slide operation of sliding the knob 4 without moving a sight line from the front of the vehicle to the touch display 1 of the in-vehicle information device. As the result, movement of the user's sight line can be reduced.

A first control unit 41 includes the touch point detecting unit 21. A second control unit 42 includes the knob touch point determining unit 22, the touch strength value calculating unit 23, and the finger-touch-on-the-knob determining unit 24. A third control unit 43 includes the event processing unit 25, and the display control unit 26. An essential part of the control device 5 includes the first control unit 41, the second control unit 42 and the third control unit 43.

Figure 4:
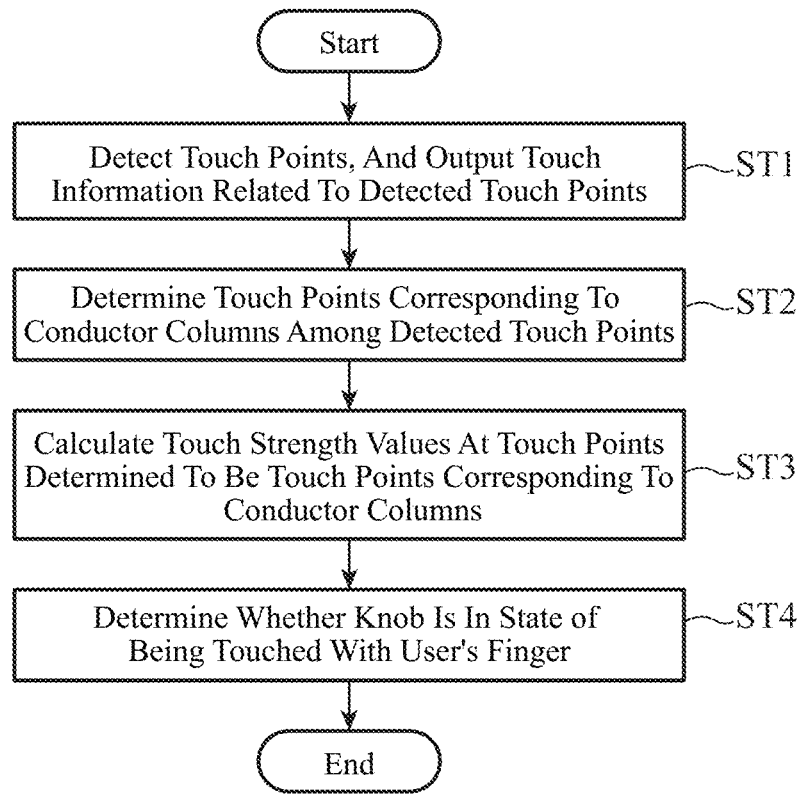
FIG. 4 is a flowchart illustrating operation of the control device according to the first embodiment of the present invention.

Next, operation of the control device 5 will be described focusing on operation of the first control unit 41 and operation of the second control unit 42 with reference to the flowchart shown in FIG. 4.

First of all, in step ST1, the touch point detecting unit 21 detects a plurality of touch points by using a signal output from the touch sensor 3. The touch point detecting unit 21 outputs touch information related to the plurality of detected touch points.

Next, in step ST2, by using the touch information output from the touch point detecting unit 21, the knob touch point determining unit 22 determines touch points corresponding to the conductor columns 13 among the plurality of touch points detected by the touch point detecting unit 21. The specific example of the determination method by the knob touch point determining unit 22 has been described above.

Next, in step ST3, by using the touch information output from the touch point detecting unit 21, the touch strength value calculating unit 23 calculates touch strength values at the respective touch points that have been determined to be the touch points corresponding to the respective conductor columns 13 by the knob touch point determining unit 22. A specific example of a method for calculating touch strength values will be described later with reference to FIGS. 5 and 6.

Next, in step ST4, by using the touch strength values calculated by the touch strength value calculating unit 23, the finger-touch-on-the-knob determining unit 24 determines whether or not the knob 4 is in a state of being touched with user's finger. In addition, by using the determination result, the finger-touch-on-the-knob determining unit 24 detects that a user's finger has come in contact with the knob 4, and that the user's finger has moved away from the knob 4. Specific examples of the determination method and the detection method by the finger-touch-on-the-knob determining unit 24 will be described later with reference to FIGS. 5 and 6.

Next, a specific example of a calculation method for calculating touch strength values, and specific examples of a determination method and a detection method by the finger-touch-on-the-knob determining unit 24 will be described with reference to FIGS. 5 and 6.

In the example shown in FIG. 5, the touch sensor 3 is based on a mutual capacitance method. In other words, a plurality of driving electrode patterns and a plurality of receiving electrode patterns are arranged so as to extend along a display surface of the display 2. A direction in which the driving electrode patterns are provided and a direction in which the receiving electrode patterns are provided are substantially orthogonal to each other, and they intersect with each other. A detection signal is adapted to be applied to each of the driving electrode patterns in the predetermined timing. In the figure, reference numeral 51 represents one electrode pattern of the plurality of driving electrode patterns; reference numeral 52 represents one electrode pattern of the plurality of receiving electrode patterns; and reference numeral 53 represents the grasping conductive portion of the knob 4.

Figure 5A:
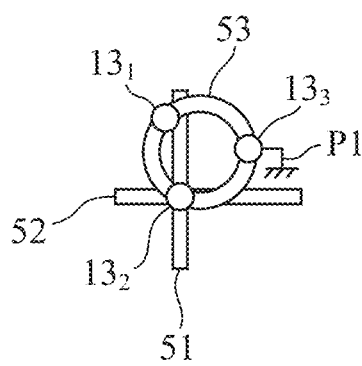
FIG. 5A is an explanatory drawing illustrating a state in which the knob is being touched with user's finger.

FIG. 5A illustrates a state in which a user's finger is not in contact with the knob 4. In an example shown in FIG. 5A, two conductor columns $13_1$, $13_2$ among the three conductor columns $13_1$ to $13_3$ provided in the knob 4 are arranged on the driving electrode pattern 51 to which a detection signal is applied. In addition, one remaining conductor column $13_3$ is disposed on the other driving electrode pattern (not illustrated) to which a detection signal is not applied. Moreover, a space between the grasping conductive portion 53 and the driving electrode pattern is set at a sufficiently small value. Accordingly, parasitic capacitance P1 occurs.

Figure 5B:
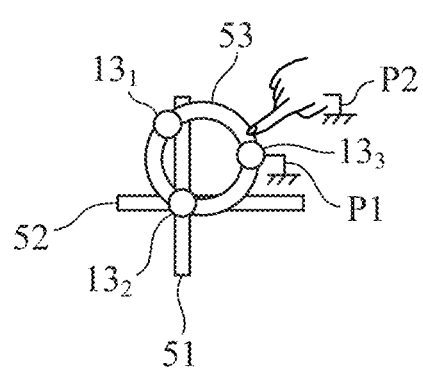
FIG. 5B is an explanatory drawing illustrating a state in which the knob is being touched with user's finger.

Meanwhile, FIG. 5B illustrates a state in which a user's finger is in contact with the knob 4. In this state, not only the parasitic capacitance P1 such as that shown in FIG. 5A, but also parasitic capacitance P2 occurs because a human body functions as GND.

In other words, in a state in which a user's finger is in contact with the knob 4, parasitic capacitance (P1+P2) that is larger than parasitic capacitance (P1) occurring in a state in which a user's finger is not in contact with the knob 4 occurs. Accordingly, touch information includes respective capacitance values at the three touch points corresponding to the conductor column $13_1$ to $13_3$. However, each of the capacitance values differs between the state (FIG. 5A) in which a user's finger is not in contact with the knob 4 and the state (FIG. 5B) in which a user's finger is in contact with the knob 4. Therefore, each of the touch strength values that are calculated by using the capacitance values also differs therebetween.

The touch strength value calculating unit 23 calculates, for example, a total value of the capacitance values at the three touch points corresponding to the conductor columns $13_1$ to $13_3$, and it uses this total value as a touch strength value. A threshold value that can distinguish between the touch strength value calculated in the state (FIG. 5A) in which a user's finger is not in contact with the knob 4 and the touch strength value calculated in the state (FIG. 5B) in which a user's finger is in contact with the knob 4 is preset in the finger-touch-on-the-knob determining unit 24.

By comparing the touch strength value calculated by the touch strength value calculating unit 23 with the threshold value, the finger-touch-on-the-knob determining unit 24 executes, at predetermined time intervals, processing of determining whether or not the touch strength value is higher than or equal to the threshold value. In other words, this threshold-value determination processing is processing that determines whether or not the knob 4 is in a state of being touched with user's finger.

When the touch strength value has changed from a value lower than the threshold value to a value higher than or equal to the threshold value in such threshold-value determination processing, the finger-touch-on-the-knob determining unit 24 detects that a user's finger has come in contact with the knob 4. In addition, when the touch strength value has changed from a value higher than or equal to the threshold value to a value lower than the threshold value in such threshold-value determination processing, the finger-touch-on-the-knob determining unit 24 detects that the user's finger has moved away from the knob 4.

It should be noted that the touch strength value is not limited to the total value of the capacitance values at the three touch points corresponding to the conductor columns $13_1$ to $13_3$. For example, the touch strength value calculating unit 23 may calculate an average value of the capacitance values at the three touch points to use this average value as the touch strength value. Alternatively, the touch strength value calculating unit 23 may calculate amounts of changes in respective capacitance values at the three touch points with respect to the time to use these amounts of changes as the touch strength values. Alternatively, after excluding one touch point at which the capacitance value is the lowest among the three touch points, the touch strength value calculating unit 23 may calculate a total value of capacitance values at two remaining touch points to use this value as the touch strength value.

In addition, the touch strength value calculating unit 23 may calculate a touch strength value by using capacitance values indicated by touch information output from the touch point detecting unit 21 in the past, in other words, past capacitance values at touch points corresponding to the conductor column $13_1$ to $13_3$.

Here, by using the total value or average value of the capacitance values at two or more touch points as the touch strength value, robustness against positional relationship between the electrode pattern and the conductor columns $13_1$ to $13_3$ can be enhanced as described below. In other words, in an example shown in FIG. 6, the touch sensor 3 is based on a self-capacitance method. Reference numerals $54_1$ to $54_8$ in FIG. 6A represent eight electrode patterns among a plurality of electrode patterns included in the touch sensor 3; and reference numerals $55_1$ to $55_8$ in FIG. 6B represent capacitance values (hereinafter may be referred to as "detection values") detected by these electrode patterns $54_1$ to $54_8$.

Figure 6A:
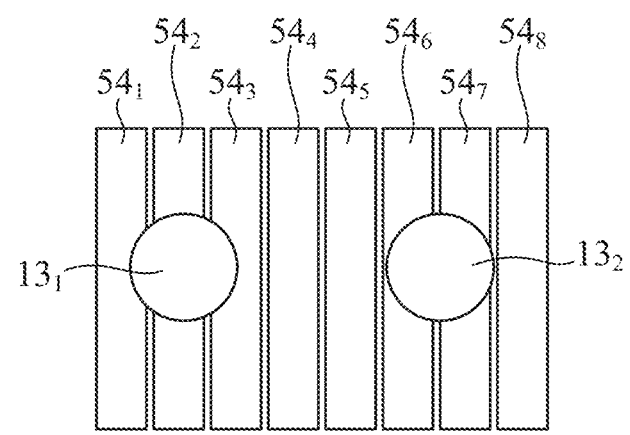
FIG. 6A is an explanatory drawing illustrating a state in which conductor columns are arranged on an electrode pattern of a touch sensor.
Figure 6B:
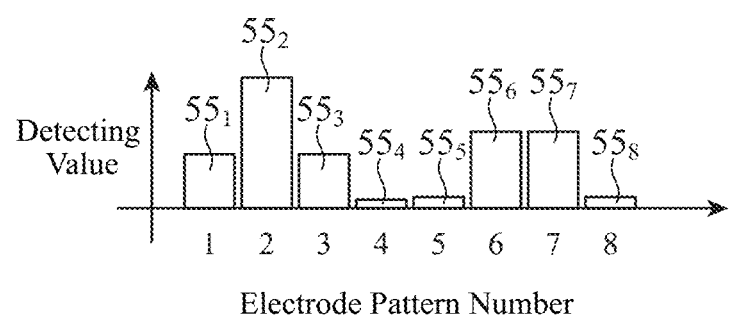
FIG. 6B is a characteristic diagram illustrating an example of capacitance values detected by respective electrode patterns in the state shown in FIG. 6A.

In an example shown in FIG. 6A, the conductor column $13_1$ is disposed so as to extend over the three electrode patterns $54_1$ to $54_3$, whereas the conductor column $13_2$ is disposed so as to extend over the two electrode patterns $54_6$, $54_7$. In this case, as shown in FIG. 6B, capacitance values detected by the electrode patterns $54_1$ to $54_3$ (in other words, capacitance values at touch points corresponding to the conductor column $13_1$) differ from capacitance values detected by the electrode patterns $54_6$, $54_7$ (in other words, capacitance values at touch points corresponding to the conductor column $13_2$).

In other words, capacitance values at touch points corresponding to the respective conductor columns $13_1$ to $13_3$ may differ depending on positional relationship of the conductor columns $13_1$ to $13_3$ with respect to the electrode patterns $54_1$ to $54_8$. Accordingly, in a case where a capacitance value at one touch point is used as a touch strength value, a touch strength value differs depending on a position at which the conductor column 13 corresponding to the one touch point is disposed, and thus there is a possibility that accuracy of the threshold-value determination processing by the finger-touch-on-the-knob determining unit 24 will decrease. Meanwhile, by using the total value or average value of the capacitance values at two or more touch points as the touch strength value, such a decrease in accuracy of the threshold-value determination processing can be suppressed. The same applies to a case where the touch sensor 3 based on the mutual capacitance method is used.

Figure 7:
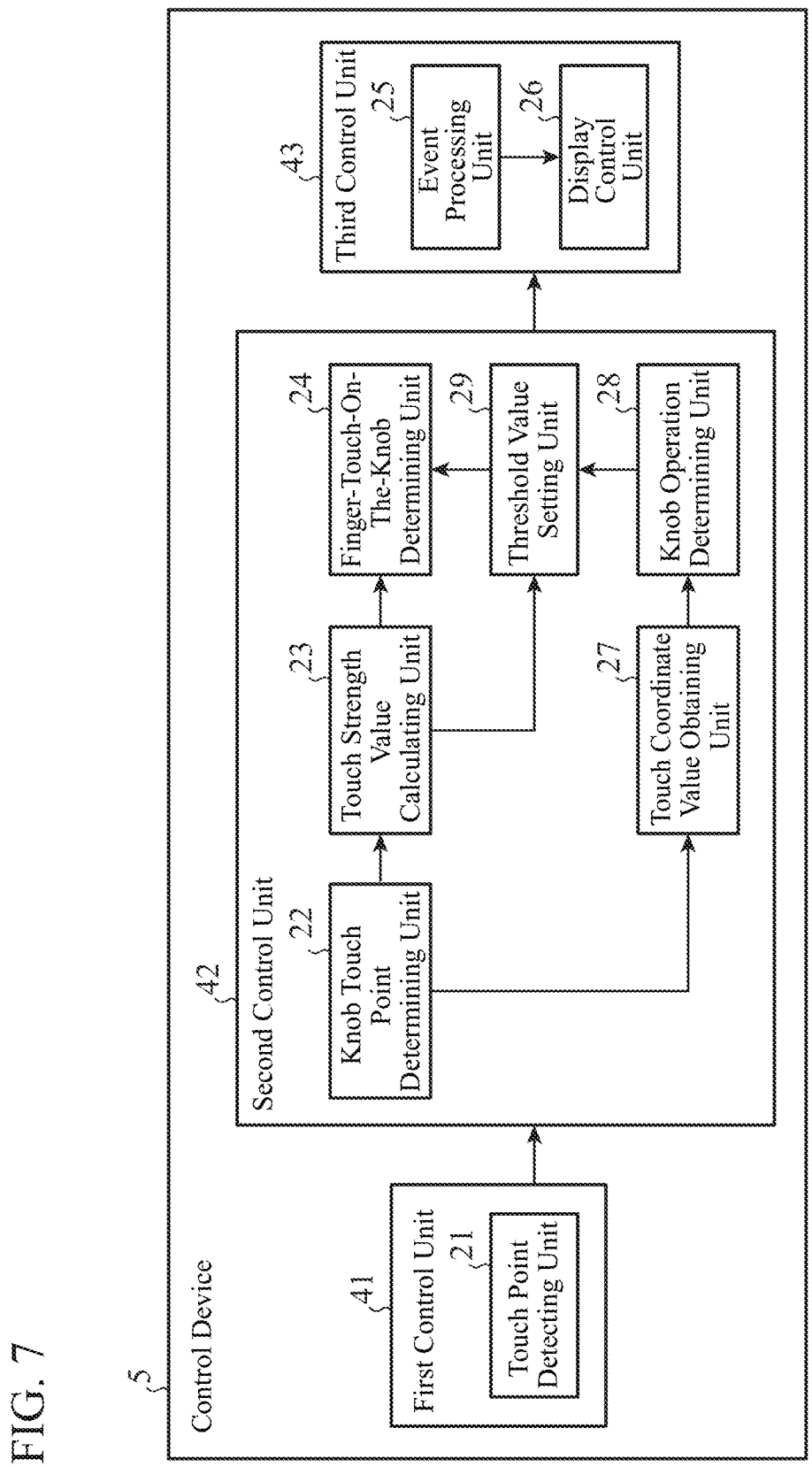
FIG. 7 is a block diagram illustrating an essential part of another control device according to the first embodiment of the present invention.

It should be noted that the threshold value in the threshold-value determination processing by the finger-touch-on-the-knob determining unit 24 may be a preset value, or it may be adaptively set as described below. A block diagram of the control device 5 used in this case is shown in FIG. 7.

As described above, touch information includes touch coordinate values of each touch point. Usually, in a state in which the knob 4 is not being operated, touch coordinate values of a touch point corresponding to each of the conductor columns 13 are constant. Meanwhile, in a state in which the knob 4 is being operated, the knob 4 turns or slides, and therefore touch coordinate values of a touch point corresponding to each of the conductor columns 13 change with respect to the time.

By using the touch information output from the touch point detecting unit 21, the touch coordinate value obtaining unit 27 obtains touch coordinate values of each of touch points that have been determined to be the touch points corresponding to the respective conductor columns 13 by the knob touch point determining unit 22.

On the basis of changes in touch coordinate values with respect to the time obtained by the touch coordinate value obtaining unit 27, the knob operation determining unit 28 determines whether or not the knob 4 is turning or sliding. In other words, the knob operation determining unit 28 determines whether or not the knob 4 is in a state of being operated.

The threshold value setting unit 29 obtains, from the touch strength value calculating unit 23, a touch strength value in the timing in which the knob operation determining unit 28 has determined that the knob 4 is in a state of being operated, and obtains, from the touch strength value calculating unit 23, a touch strength value in the timing in which the knob operation determining unit 28 has determined that the knob 4 is in a state of not being operated. The threshold value setting unit 29 calculates an intermediate value of these touch strength values, and it sets this intermediate value as a threshold value in the threshold-value determination processing by the finger-touch-on-the-knob determining unit 24.

For example, in a case where the touch point detecting unit 21 is operating in what is called a "glove mode", an improvement in detection sensitivity enables to detect a touch point irrespective of whether or not a user wears a glove. Hereinafter, it is assumed that "a state in which a user's finger is in contact" includes not only a state in which a user's finger is directly in contact, but also a state in which a user's finger is substantially in contact through a cloth of gloves.

However, capacitance values at touch points corresponding to the conductor columns 13 in a state in which a finger of a user is in contact with the knob 4 become different values depending on whether or not the user wears gloves. As the result, touch strength values calculated by the touch strength value calculating unit 23 also become different values. Meanwhile, when the threshold value setting unit 29 adaptively sets a threshold value by using the touch strength values calculated by the touch strength value calculating unit 23, irrespective of whether or not the user wears gloves, it becomes possible to determine, by the threshold-value determination processing, whether or not the knob 4 is in a state of being touched with user's finger.

In addition, when the user wears gloves, a difference value between capacitance values at touch points corresponding to the conductor columns 13 in a state in which a user's finger is in contact with the knob 4 and the capacitance values in a state in which a user's finger is not in contact with the knob 4 decreases, and therefore it becomes difficult to set a threshold value at an appropriate value. Meanwhile, when the threshold value setting unit 29 adaptively sets a threshold value by using the touch strength values calculated by the touch strength value calculating unit 23, threshold values can be set at appropriate values even when the user wears gloves.

In addition, the finger-touch-on-the-knob determining unit 24 may have a function of suppressing, what is called, occurrence of "chattering" as described below.

Quickly turning or sliding the knob 4 by the user may temporarily generate a gap between the knob 4 and a display surface of the touch display 1, or it may cause the bottom plate 12 of the knob 4 to be temporarily warped. In this case, the total value of the capacitance values at the touch points corresponding to the respective conductor columns $13_1$ to $13_3$ temporarily decreases, or a part of the conductor columns of the conductor columns $13_1$ to $13_3$ is not temporarily detected as touch points. As the result, a phenomenon in which in spite of a state in which a user's finger is in contact with the knob 4, the touch strength value temporarily becomes a value lower than the threshold value, which causes a result of threshold-value determination processing by the finger-touch-on-the-knob determining unit 24 to alternately switch within a short time, what is called chattering, occurs.

Figure 8:
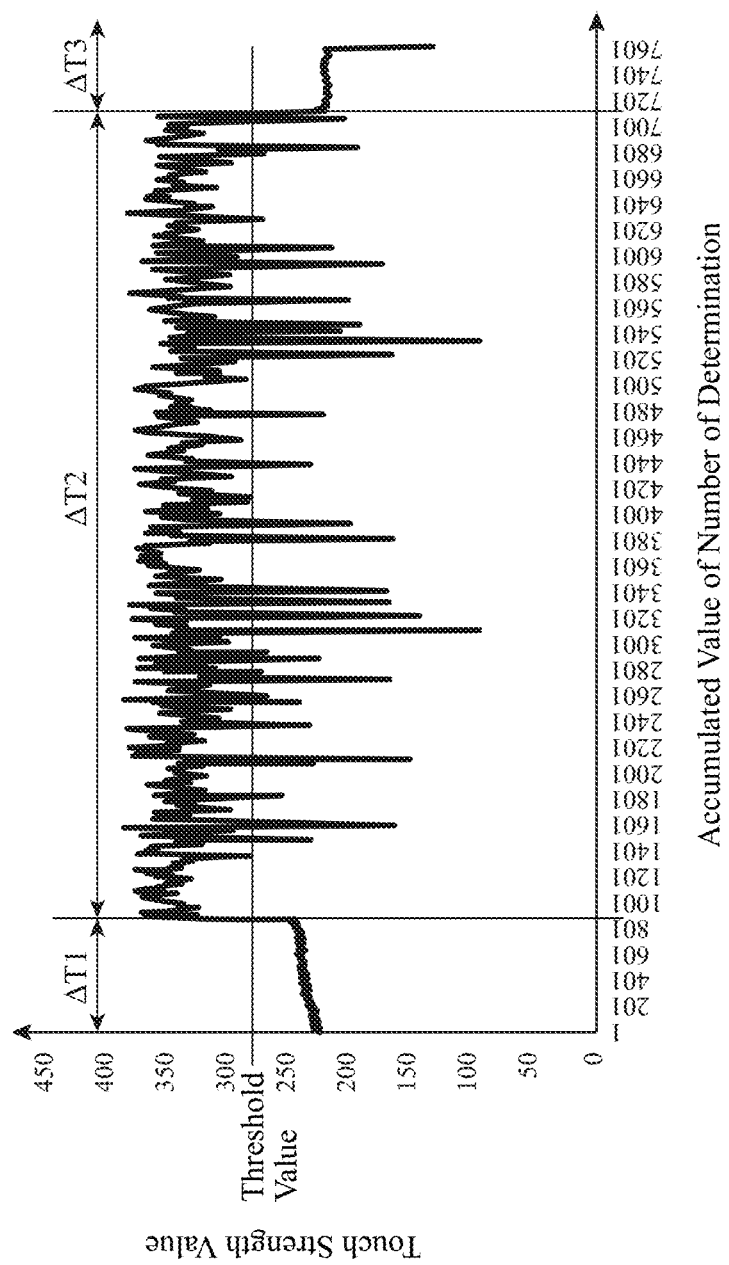
FIG. 8 is a characteristic diagram illustrating an example of touch strength values with respect to the time.

FIG. 8 is a characteristic diagram illustrating an example of touch strength values with respect to the time. A total value of respective capacitance values at three touch points corresponding to the conductor columns $13_1$ to $13_3$ is used as each of the touch strength values. In the figure, numerical values given along the time axis each indicate an accumulated value of the number of times a determination has been made by the finger-touch-on-the-knob determining unit 24, in other words, an accumulated value of the number of times the detection result by the finger-touch-on-the-knob determining unit 24 has been processed as an event by the event processing unit 25.

As shown in FIG. 8, in time sections AT1, AT3 during which a user's finger is not in contact with the knob 4, the touch strength value is always lower than a threshold value. However, in a time section AT2 during which the user's finger is in contact with the knob 4, quickly turning or sliding the knob 4 by the user causes the touch strength value to be temporarily lower than the threshold value in a plurality of timings.

Here, in each of the plurality of timings, the time during which the touch strength value is lower than the threshold value is the time corresponding to the number of times a determination has been made by the finger-touch-on-the-knob determining unit 24. Accordingly, when the determination result indicating that the touch strength value is lower than the threshold value, in other words, the determination result indicating a state in which a user's finger is not in contact with the knob 4, has been successively obtained a predetermined number of times (hereinafter, referred to as "reference number of times"), the finger-touch-on-the-knob determining unit 24 settles the determination result. In other words, even if the determination result indicating that the touch strength value is lower than the threshold value has been obtained once, until this determination result is obtained the reference number of times in succession, the finger-touch-on-the-knob determining unit 24 maintains the determination result indicating that the touch strength value is higher than or equal to the threshold value. By setting the reference number of times at an appropriate value, occurrence of chattering can be suppressed.

It should be noted that the threshold-value determination processing performed by the finger-touch-on-the-knob determining unit 24 may be processing of determining whether or not the touch strength value is higher than the threshold value as an alternative to the processing of determining whether or not the touch strength value is higher than or equal to the threshold value. In this case, when the touch strength value has changed from a value lower than or equal to the threshold value to a value higher than the threshold value, the finger-touch-on-the-knob determining unit 24 detects that a user's finger has come in contact with the knob 4. In addition, when the touch strength value has changed from a value higher than the threshold value to a value lower than or equal to the threshold value, the finger-touch-on-the-knob determining unit 24 detects that the user's finger has moved away from the knob 4. With respect to the function of suppressing occurrence of chattering, when the determination result indicating that the touch strength value is lower than or equal to the threshold value has been obtained the reference number of times in succession, the finger-touch-on-the-knob determining unit 24 settles the determination result.

In addition, arrangement of the conductor columns $13_1$ to $13_3$ is not limited to positions corresponding to respective vertexes of an equilateral triangle. The arrangement may be, for example, positions corresponding to respective vertexes of a right triangle or an isosceles triangle. Moreover, the number of conductor columns 13 included in the knob 4 is not limited to three. For example, four conductor columns 13 may be arranged at positions corresponding to respective vertexes of a quadrangle. The contents of the determination processing performed by the knob touch point determining unit 22 are not limited to the above-described specific example. The determination processing has only to conform to the number of conductor columns 13 in the knob 4 and arrangement of the conductor columns 13.

As described above, the operation input device 100 according to the first embodiment is provided with: the knob 4 for operations, disposed in a display region of the touch display 1; the conductor columns 13 that are provided in the knob 4, and that can be detected as touch points irrespective of whether or not the knob 4 is in a state of being touched with user's finger; the touch point detecting unit 21 for detecting a plurality of touch points including the touch points corresponding to the conductor columns 13, and outputting touch information related to the plurality of detected touch points; the knob touch point determining unit 22 for determining, by using the touch information, the touch points corresponding to the conductor columns 13 among the plurality of touch points detected by the touch point detecting unit 21; the touch strength value calculating unit 23 for calculating touch strength values at the touch points corresponding to the conductor column 13 by using the touch information and the determination result by the knob touch point determining unit 22; and the finger-touch-on-the-knob determining unit 24 for determining, by using the touch strength values, whether or not the knob 4 is in a state of being touched with user's finger. Consequently, the conductor columns 13 can be detected as touch points irrespective of whether or not the knob 4 is in a state of being touched with user's finger, and at the same time, whether or not the knob 4 is in a state of being touched with user's finger can be determined.

In addition, by executing threshold-value determination processing in which the touch strength values are used, the finger-touch-on-the-knob determining unit 24 determines whether or not the knob 4 is in a state of being touched with user's finger. By using the principle described with reference to FIG. 5, whether or not the knob 4 is in a state of being touched with user's finger can be determined in the threshold-value determination processing in which the touch strength values are used.

In addition, the operation input device 100 is provided with: the touch coordinate value obtaining unit 27 for obtaining touch coordinate values of each of the touch points corresponding to the conductor columns 13 by using the touch information and the determination result by the knob touch point determining unit 22; the knob operation determining unit 28 for determining, on the basis of changes in the touch coordinate values with respect to time, whether or not the knob 4 is in a state of being operated; and the threshold value setting unit 29 for setting a threshold value used in threshold-value determination processing by using a touch strength value obtained in the state in which the knob 4 is being operated. Consequently, for example, even when the user wears gloves, the threshold value used in the threshold-value determination processing performed by the finger-touch-on-the-knob determining unit 24 can be set at an appropriate value.

In addition, when the determination result indicating that the touch strength value is lower than the threshold value, or lower than or equal to the threshold value, is obtained a reference number of times in succession in the threshold-value determination processing, the finger-touch-on-the-knob determining unit 24 settles the determination result. Consequently, occurrence of what is called chattering can be suppressed.

Second Embodiment

Figure 9:
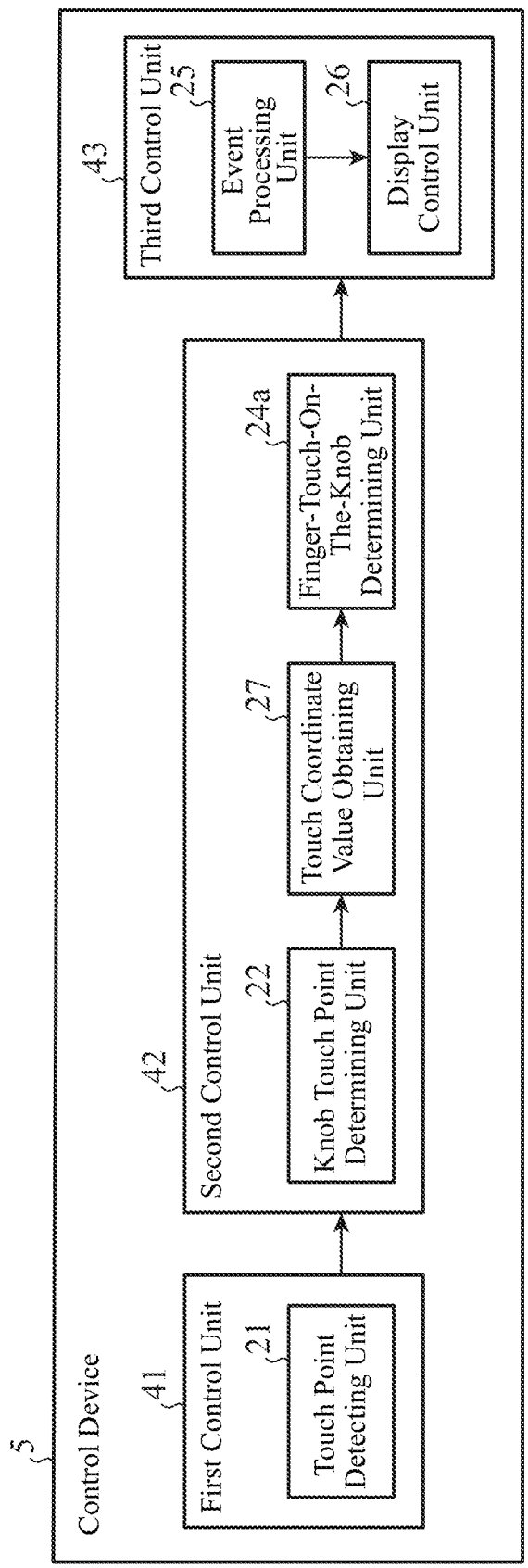
FIG. 9 is a block diagram illustrating an essential part of a control device according to a second embodiment of the present invention.

FIG. 9 is a block diagram illustrating an essential part of a control device according to a second embodiment. An operation input device 100 according to the second embodiment will be described with reference to FIG. 9. It should be noted that a hardware configuration of the operation input device 100 according to the second embodiment is similar to that described with reference to FIG. 1 in the first embodiment, and therefore FIG. 1 is cited, and the explanation of the hardware configuration will be omitted. In addition, a structure of a knob 4 according to the second embodiment is similar to that described with reference to FIG. 2 in the first embodiment, and therefore FIG. 2 is cited, and the explanation of the structure will be omitted. Moreover, in FIG. 9, identical reference numerals are given to blocks that are similar to those shown in FIG. 3, and the explanation thereof will be omitted.

By using the touch information output from the touch point detecting unit 21, the touch coordinate value obtaining unit 27 obtains touch coordinate values of each of touch points that have been determined to be the touch points corresponding to the respective conductor columns 13 by the knob touch point determining unit 22.

On the basis of changes in touch coordinate values with respect to the time obtained by the touch coordinate value obtaining unit 27, a finger-touch-on-the-knob determining unit 24a determines whether or not the knob 4 is in a state of being touched with user's finger. A first specific example of a determination method by the finger-touch-on-the-knob determining unit 24a will be described later with reference to FIGS. 11 and 12. In addition, a second specific example of the determination method by the finger-touch-on-the-knob determining unit 24a will be described later too.

Figure 10:
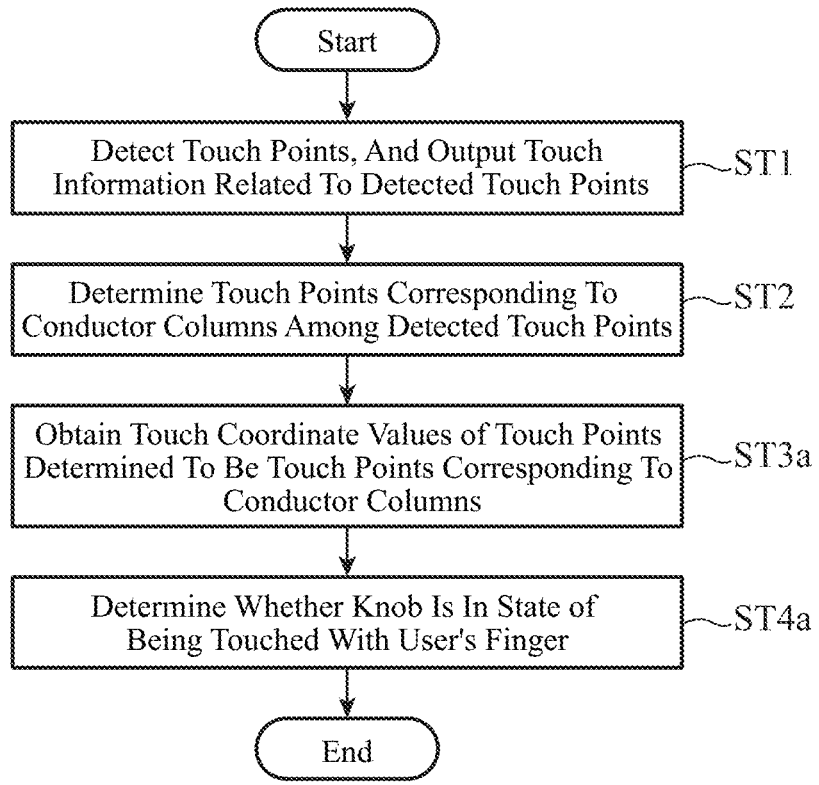
FIG. 10 is a flowchart illustrating operation of the control device according to the second embodiment of the present invention.

Next, operation of the control device 5 according to the second embodiment will be described focusing on operation of the first control unit 41 and operation of the second control unit 42 with reference to the flowchart shown in FIG. 10.

First of all, the touch point detecting unit 21 executes processing in step ST1, and subsequently the knob touch point determining unit 22 executes processing in step ST2. Processing contents of steps ST1, ST2 are similar to those described with reference to FIG. 4 in the first embodiment, and therefore the explanation thereof will be omitted.

Next, in step ST3a, by using touch information output from the touch point detecting unit 21, the touch coordinate value obtaining unit 27 obtains touch coordinate values of each of the respective touch points that have been determined to be the touch points corresponding to the respective conductor columns 13 by the knob touch point determining unit 22.

Next, in step ST4a, on the basis of changes in touch coordinate values with respect to the time obtained by the touch coordinate value obtaining unit 27, the finger-touch-on-the-knob determining unit 24a determines whether or not the knob 4 is in a state of being touched with user's finger. A first specific example of a determination method by the finger-touch-on-the-knob determining unit 24a will be described later with reference to FIGS. 11 and 12. In addition, a second specific example of the determination method by the finger-touch-on-the-knob determining unit 24a will be described later too.

Next, the first specific example of the determination method by the finger-touch-on-the-knob determining unit 24a will be described with reference to FIGS. 11 and 12.

Figure 11A:
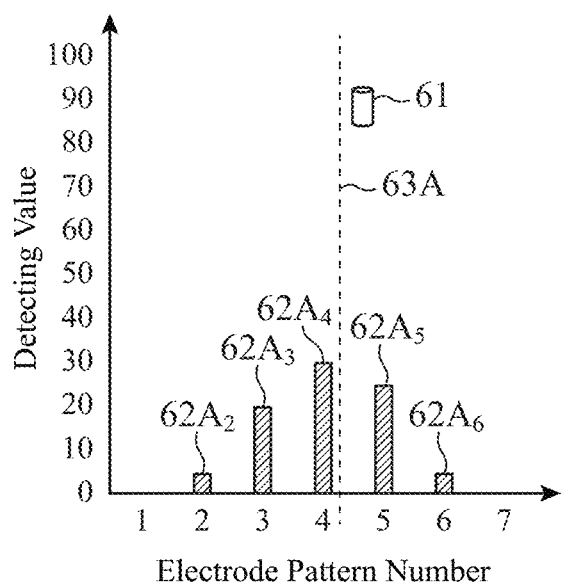
FIG. 11A is a characteristic diagram illustrating an example of capacitance values detected by respective electrode patterns of a touch sensor in a state in which the knob is being touched with user's finger.
Figure 11B:
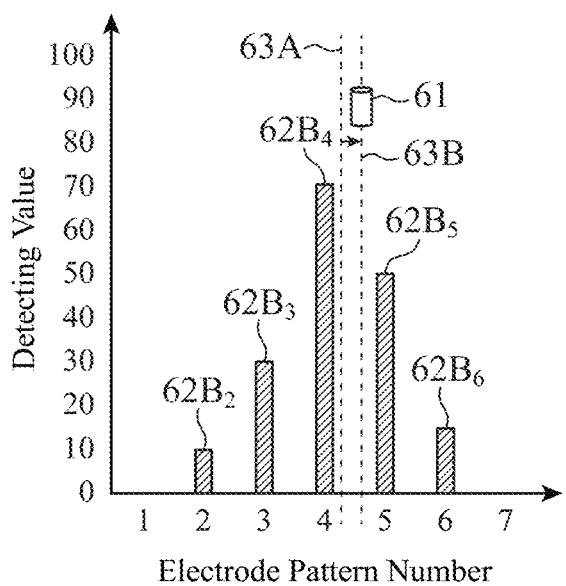
FIG. 11B is a characteristic diagram illustrating an example of capacitance values detected by respective electrode patterns of the touch sensor in a state in which the knob is in a state of being touched with user's finger.

In each of FIGS. 11A and 11B, numerical values given along the horizontal axis indicate numbers assigned to seven electrode patterns in the touch sensor 3; and reference numeral 61 indicates a position of the conductor column $13_1$ with respect to a direction in which the seven electrode patterns are arranged. Reference numerals $62A_2$ to $62A_6$ shown in FIG. 11A indicate respective capacitance values (hereinafter may be referred to as "detection values") detected by the second to sixth electrode patterns among the seven electrode patterns in a state in which a user's finger is not in contact with the knob 4. Reference numerals $62B_2$ to $62B_6$ shown in FIG. 11B indicate respective detection values detected by the second to sixth electrode patterns among the seven electrode patterns in a state in which the user's finger is in contact with the knob 4. Reference numeral 63A shown in FIG. 11A indicates touch coordinate values of a touch point corresponding to the conductor column $13_1$ with respect to the direction in which the electrode patterns are arranged in a state in which a user's finger is not in contact with the knob 4. Reference numeral 63B shown in FIG. 11B indicates touch coordinate values of a touch point corresponding to the conductor column $13_1$ with respect to the direction in which the electrode patterns are arranged in a state in which the user's finger is in contact with the knob 4.

As shown in FIG. 11, when a user's finger has come in contact with the knob 4, detection values by the respective second to sixth electrode patterns become higher, and a ratio of detection values by other electrode patterns to detection values by individual electrode patterns changes. As the result, touch coordinate values of the touch point corresponding to the conductor column $13_1$ change in a predetermined direction (63A→63B in the figure) with respect to the position 61 of the conductor column $13_1$. Similarly, when the user's finger has moved away from the knob 4, touch coordinate values of the touch point corresponding to the conductor column 13₁ change in a reverse direction (63B→63A in the figure) with respect to the position 61 of the conductor column 13₁.

Accordingly, the memory 7 stores beforehand a data table in which possible touch coordinate values of the touch point corresponding to the conductor column 13 in a state in which a user's finger is not in contact with the knob 4 are associated with estimated values of amounts of changes in the touch coordinate values detected when the user's finger has come in contact with the knob 4 (refer to FIG. 12). In addition, the memory 7 stores beforehand a data table (not illustrated) in which possible touch coordinate values of the touch point corresponding to the conductor column 13 in a state in which the user's finger is in contact with the knob 4 are associated with estimated values of amounts of changes in the touch coordinate values occurring when the user's finger has moved away from the knob 4. In other words, these data tables each indicate estimated values of difference values between touch coordinate values of the touch point corresponding to the conductor column 13 in a state in which a user's finger is in contact with the knob 4 and the touch coordinate values in a state in which a user's finger is not in contact with the knob 4.

The finger-touch-on-the-knob determining unit 24*a* calculates amounts of changes in touch coordinate values with respect to the time obtained by the touch coordinate value obtaining unit 27. In addition, the finger-touch-on-the-knob determining unit 24*a* obtains estimated values included in the data tables stored to the memory 7. By comparing values of the calculated amounts of changes with the obtained estimated values, the finger-touch-on-the-knob determining unit 24*a* detects that a user's finger has come in contact with the knob 4, and that the user's finger has moved away from the knob 4. By using the detection result, the finger-touch-on-the-knob determining unit 24*a* determines whether or not the knob 4 is in a state of being touched with user's finger.

For example, the finger-touch-on-the-knob determining unit 24*a* calculates amounts of changes ($\Delta$Xkl $\Delta$Ykl) in touch coordinate values after change (Xk+$\Delta$Xkl, Yk+$\Delta$Ykl) with respect to touch coordinate values before change (Xk, Yl). In a case where the values of the calculated amounts of changes ($\Delta$Xkl, $\Delta$Ykl) agree with the estimated values ($\Delta$Xkl, $\Delta$Ykl) included in the data table shown in FIG. 12, the finger-touch-on-the-knob determining unit 24*a* detects that a user's finger has come in contact with the knob 4. Here, "k" is a variable that differs for each individual touch point, and it can have n pieces of values ("n" is an integer that is larger than or equal to 2). In addition, "l" is a variable that differs for each individual touch point, and it can have m pieces of values (m is an integer that is larger than or equal to 2).

Next, the second specific example of the determination method by the finger-touch-on-the-knob determining unit 24*a* will be described.

Usually, the touch display 1 based on the capacitive sensing method is capable of correctly detecting a touch point when GND electric potential of a human body agrees with GND electric potential of the touch sensor 3. Here, in a case where disagreement between GND electric potential of the human body and GND electric potential of the touch sensor 3 has occurred due to power supply noises, the noises are applied to detection values by the touch sensor 3, which causes the detection values to fluctuate within a short period of time. As the result, touch coordinate values of each touch point indicated by touch information also fluctuate within a short period of time, and what is called "fluctuations in coordinates" occurs.

According to the principle similar to the above, in a state in which a user's finger is in contact with the knob 4, capacitance values at touch points corresponding to the conductor columns 13 fluctuate within a short period of time due to power supply noises. As the result, fluctuations in coordinates occur at the touch points corresponding to the conductor columns 13 as well.

Accordingly, by executing threshold-value determination processing such as that described below, the finger-touch-on-the-knob determining unit 24*a* determines whether or not fluctuations in coordinates have occurred. In other words, the finger-touch-on-the-knob determining unit 24*a* calculates amounts of changes in touch coordinate values obtained by the touch coordinate value obtaining unit 27 over predetermined time (hereinafter, referred to as "reference time"). The finger-touch-on-the-knob determining unit 24*a* compares values of the calculated amounts of changes with a predetermined threshold value. In addition, by executing determination processing similar to that executed by the knob operation determining unit 28 shown in FIG. 7, the finger-touch-on-the-knob determining unit 24*a* determines whether or not the knob 4 is turning or sliding. In a case where the calculated amounts of changes are higher than or equal to the threshold value, and at the same time the knob 4 is neither sliding nor turning, the finger-touch-on-the-knob determining unit 24*a* determines that fluctuations in coordinates are occurring. In the other cases, the finger-touch-on-the-knob determining unit 24*a* determines that fluctuations in coordinates are not occurring.

In a case where it has been determined that fluctuations in coordinates are occurring, or in a case where it has been determined that the knob 4 is turning or sliding, the finger-touch-on-the-knob determining unit 24*a* determines that a user's finger is in a state of being in contact with the knob 4. Meanwhile, in a case where the knob 4 is neither sliding nor turning, and at the same time fluctuations in coordinates are not occurring, the finger-touch-on-the-knob determining unit 24*a* determines that the user's finger is in a state of not being in contact with the knob 4.

It should be noted that the operation input device 100 according to the second embodiment can employ various modified examples similar to those described in the first embodiment. For example, arrangement of the conductor columns 13₁ to 13₃ is not limited to positions corresponding to respective vertexes of an equilateral triangle, and the number of conductor columns 13 is not limited to three.

As described above, the operation input device 100 according to the second embodiment is provided with: the knob 4 for operations, disposed in a display region of the touch display 1; the conductor columns 13 that are provided in the knob 4, and that can be detected as touch points irrespective of whether or not the knob 4 is in a state of being touched with user's finger; the touch point detecting unit 21 for detecting a plurality of touch points including the touch points corresponding to the conductor columns 13, and outputting touch information related to the plurality of detected touch points; the knob touch point determining unit 22 for determining, by using the touch information, the touch points corresponding to the conductor columns 13 among the plurality of touch points detected by the touch point detecting unit 21; the touch coordinate value obtaining unit 27 for obtaining touch coordinate values of each of the touch points corresponding to the conductor columns 13 by using the touch information and the determination result by the knob touch point determining unit 22; and the finger-touch-on-the-knob determining unit 24*a* for determining, on the basis of changes in the touch coordinate values with respect to time, whether or not the knob 4 is in a state of being touched with user's finger. Consequently, the conductor columns 13 can be detected as touch points irrespective of whether or not the knob 4 is in a state of being touched with user's finger, and at the same time, whether or not the knob 4 is in a state of being touched with user's finger can be determined. In addition, even in a case where capacitance values of respective touch points are not included in the touch information output from the touch point detecting unit 21, whether or not the knob 4 is in a state of being touched with user's finger can be determined.

Moreover, the finger-touch-on-the-knob determining unit 24*a* calculates amounts of changes in touch coordinate values with respect to the time, obtains estimated values of difference values between touch coordinate values in the state in which a user's finger is in contact with the knob 4 and touch coordinate values in a state in which a user's finger is not in contact with the knob 4, and compares values of the amounts of changes with the estimated values to determine whether or not the knob 4 is in a state of being touched with user's finger. By using the principle described with reference to FIG. 11, comparison of the values of the amounts of changes in touch coordinate values with the estimated values included in the data table enables to determine whether or not the knob 4 is in a state of being touched with user's finger. Alternatively, the finger-touch-on-the-knob determining unit 24*a* calculates amounts of changes in touch coordinate values over the reference time, and it executes threshold-value determination processing in which values of the amounts of changes are used, to determine whether or not the knob 4 is in a state of being touched with user's finger. By using the above-described principle, whether or not the knob 4 is in a state of being touched with user's finger can be determined on the basis of whether or not fluctuations in coordinates are occurring.

Third Embodiment

Figure 13:
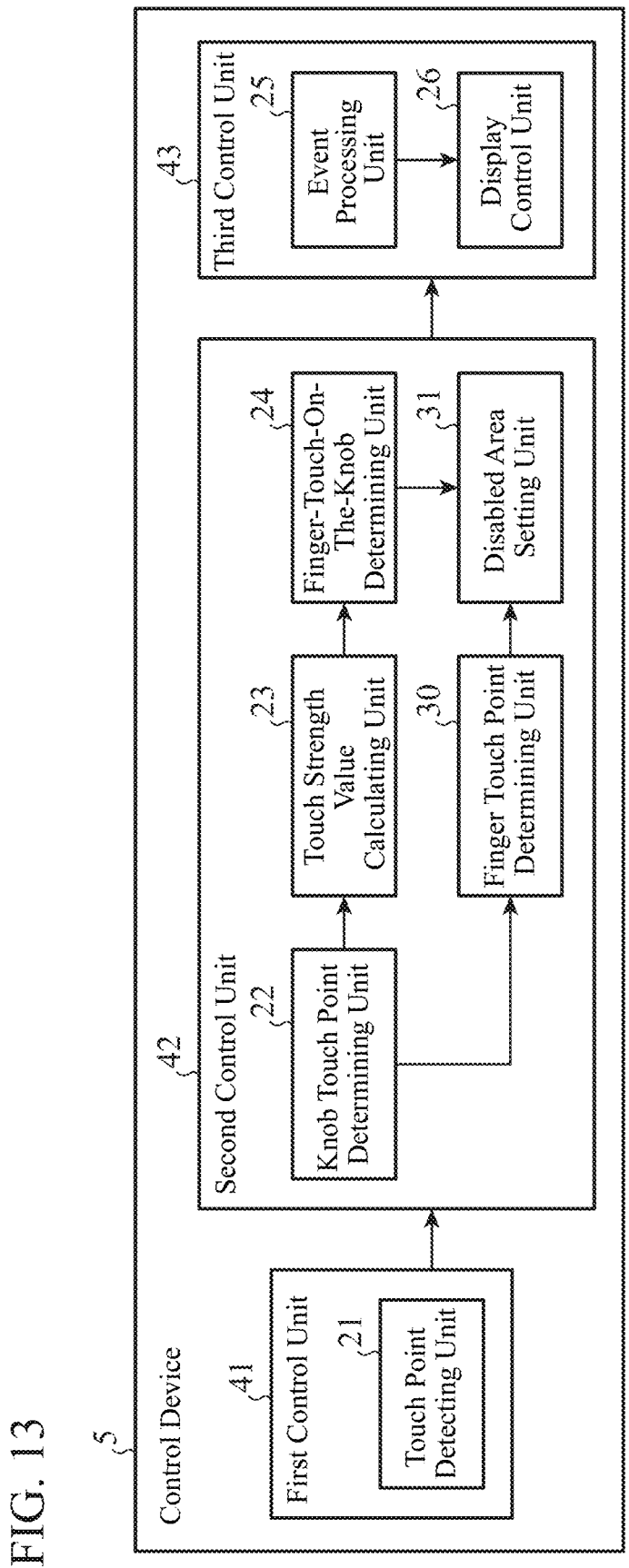
FIG. 13 is a block diagram illustrating an essential part of a control device according to a third embodiment of the present invention.

FIG. 13 is a block diagram illustrating an essential part of a control device according to a third embodiment. An operation input device 100 according to the third embodiment will be described with reference to FIG. 13. It should be noted that a hardware configuration of the operation input device 100 according to the third embodiment is similar to that described with reference to FIG. 1 in the first embodiment, and therefore FIG. 1 is cited, and the explanation of the hardware configuration will be omitted. In addition, a structure of a knob 4 according to the third embodiment is similar to that described with reference to FIG. 2 in the first embodiment, and therefore FIG. 2 is cited, and the explanation of the structure will be omitted. Moreover, in FIG. 13, identical reference numerals are given to blocks that are similar to those shown in FIG. 1, and the explanation thereof will be omitted.

By using touch information output from the touch point detecting unit 21 and the determination result by the knob touch point determining unit 22, a finger touch point determining unit 30 determines touch points corresponding to a user's finger among a plurality of touch points detected by the touch point detecting unit 21.

Specifically, for example, the finger touch point determining unit 30 determines that among the plurality of touch points detected by the touch point detecting unit 21, remaining touch points, excluding the touch points that have been determined to be the respective touch points corresponding to the conductor columns 13 by the knob touch point determining unit 22, are touch points corresponding to the user's finger. It should be noted that the finger touch point determining unit 30 may determine that only a part (for example, a touch point at which a capacitance value, the area or load fulfills a predetermined condition) of the remaining touch points is a touch point corresponding to the user's finger.

A disabled area setting unit 31 sets an area in which operation input by a touch point corresponding to a user's finger is disabled (hereinafter, referred to as "operation disabled area") in the display region of the touch display 1. Here, the disabled area setting unit 31 is configured to set, on the basis of the determination result by the finger-touch-on-the-knob determining unit 24, operation disabled areas that differ from each other between a state in which a user's finger is in contact with the knob 4 and a state in which a user's finger is not in contact with the knob 4.

Figure 14A:
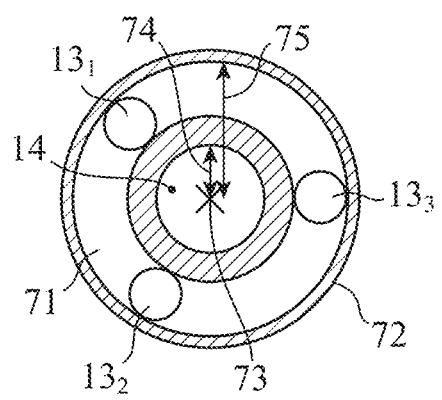
FIG. 14A is an explanatory drawing illustrating an example of an operation disabled area in a state in which the knob is being touched with user's finger.
Figure 14B:
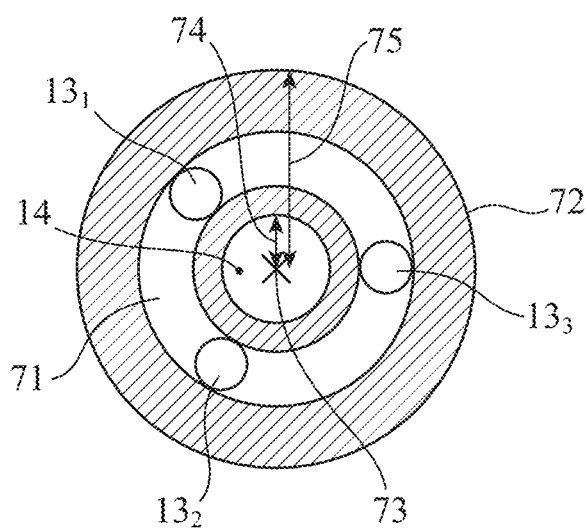
FIG. 14B is an explanatory drawing illustrating an example of an operation disabled area in a state in which the knob is being touched with user's finger.

FIG. 14A illustrates an example of an operation disabled area in a state in which a user's finger is not in contact with the knob 4. FIG. 14B illustrates an example of an operation disabled area in a state in which a user's finger is in contact with the knob 4. In the figure, reference numeral 71 represents a grasping conductive portion of the knob 4; and reference numeral 72 represents an operation disabled area.

In an example shown in FIG. 14, the operation disabled area 72 is substantially circular. A central portion of the operation disabled area 72 substantially coincides with a central portion of the knob 4 (reference numeral 73 in the figure), a radius 74 of an inner peripheral portion of the operation disabled area 72 is smaller than a radius of an inner peripheral portion of the knob 4, and a radius 75 of an outer peripheral portion of the operation disabled area 72 is larger than a radius of an outer peripheral portion of the knob 4. In other words, irrespective of whether or not the knob 4 is in a state of being touched with user's finger, the knob 4 is adapted to be disposed in the operation disabled area 72.

However, with respect to the radius 75 of the outer peripheral portion of the operation disabled area 72, the radius 75 in a state in which a user's finger is in contact with the knob 4 (FIG. 14B) is larger than the radius 75 in a state in which a user's finger is not in contact with the knob 4 (FIG. 14A). Consequently, when a finger of the user who is grasping the knob 4 has come in contact with the display surface of the touch display 1 unintentionally, the contact can be prevented from being processed as an event by the event processing unit 25.

Figure 15:
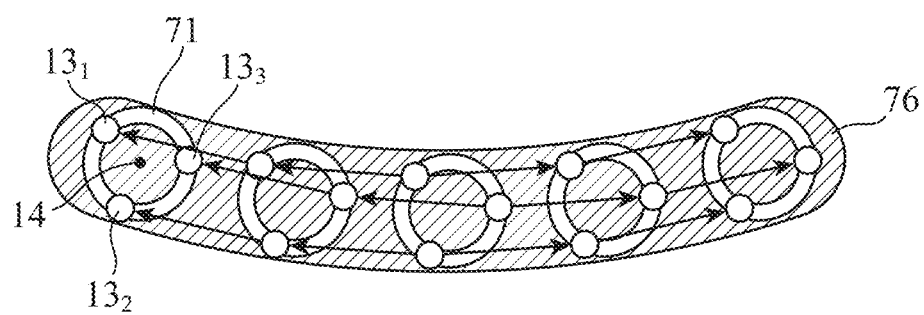
FIG. 15 is an explanatory drawing illustrating another example of an operation disabled area in a state in which the knob is being touched with user's finger.

FIG. 15 illustrates another example of an operation disabled area in a state in which a user's finger is not in contact with the knob 4. In an example shown in FIG. 15, the knob 4 is slidably mounted so as to be capable of sliding along a predetermined path by an unillustrated mechanism. The disabled area setting unit 31 sets the area 72 similar to that shown in FIG. 14A in an operation disabled area in a state in which a user's finger is not in contact with the knob 4. Meanwhile, in a state in which a user's finger is in contact with the knob 4, as shown in FIG. 15, the disabled area setting unit 31 sets an area 76 extending along the path related to sliding of the knob 4 in the operation disabled area.

Figure 16A:
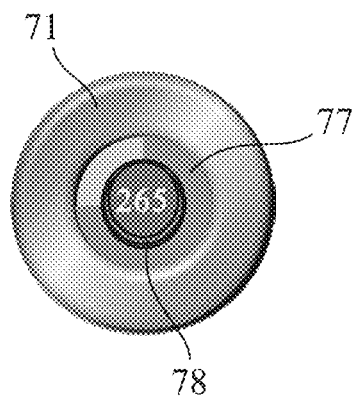
FIG. 16A is an explanatory drawing illustrating a state in which an image corresponding to an operation disabled area is displayed in a state in which the knob is being touched with user's finger.
Figure 16B:
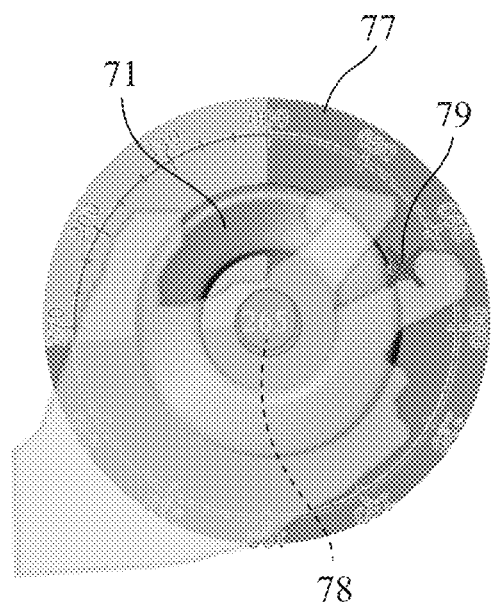
FIG. 16B is an explanatory drawing illustrating a state in which the image corresponding to the operation disabled area is displayed in a state in which the knob is being touched with user's finger.

In addition, the display control unit 26 may display, on the touch display 1, an image (hereinafter, referred to as "disabled area image") corresponding to the operation disabled area set by the disabled area setting unit 31. FIG. 16 illustrates an example of the disabled area image.

In an example shown in FIG. 16, the operation disabled area is set in a substantially circular area that is similar to the area 72 shown in FIG. 14. Such an image that causes a user to recognize that "operation is not possible" is displayed as a disabled area image in the operation disabled area. In the example shown in FIG. 16, a volume-gauge-shaped image 77 is displayed. By visually recognizing the volume gauge-shaped image 77, the user can visually grasp the operation disabled area.

It should be noted that an area that is inner than the inner peripheral portion of the substantially circular operation disabled area is an area in which operation input by a touch point corresponding to a user's finger is enabled (hereinafter, referred to as "operation enabled area"). Accordingly, such an image that causes a user to recognize that "operation is possible" is displayed in the area. In the example shown in FIG. 16, a push button-shaped image 78 is displayed.

In addition, in a case where a touch point corresponding to a user's finger exists in the operation disabled area, the display control unit 26 may display an image that indicates the point, and that causes the user to recognize that "operation has been disabled". In an example shown in FIG. 16B, an "x"-shaped image 79 is displayed at the point.

Moreover, the display control unit 26 may display a disabled area image corresponding to the operation disabled area shown in FIG. 15, in other words, the disabled area image extending along the path of the knob 4. This enables the user to visually grasp that although operation input by sliding of the knob 4 is possible, operation input by finger's contact to the operation disabled area is impossible.

It should be noted that the operation disabled area is not limited to the specific example shown in FIG. 14 or FIG. 15. For example, with respect to the operation disabled area 72, in a case where it is not necessary to process, as an event, a contact of a user's finger to the display region in a hollow portion 14 of the knob 4, the whole display region in the hollow portion 14 may be set as an operation disabled area. In this case, whether or not it is necessary to process the contact as an event differs depending on a kind or contents of control assigned to the sliding operation or turning operation of the knob 4. Accordingly, information indicating the contents or kind of the control is stored in the memory 7 beforehand, the information is read from the memory 7 for the operation disabled area 72, and whether or not the whole display region in the hollow portion 14 is set as the operation disabled area is determined.

Figure 17:
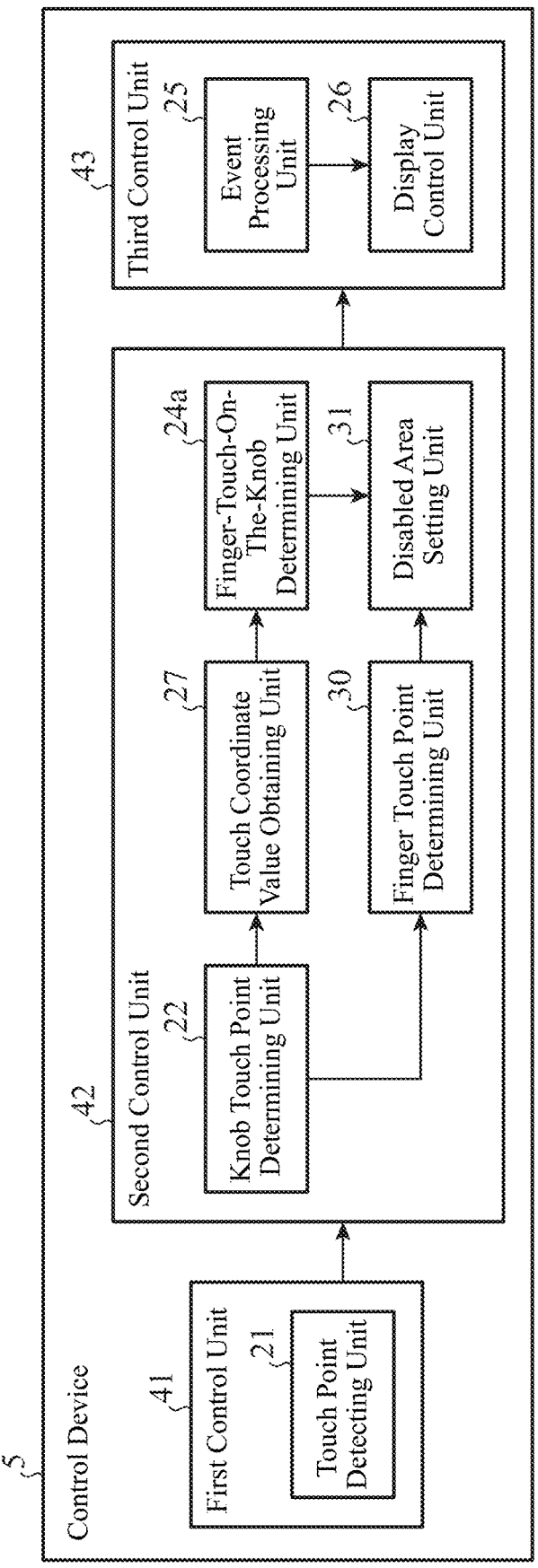
FIG. 17 is a block diagram illustrating an essential part of another control device according to the third embodiment of the present invention.

Further, the operation input device 100 according to the third embodiment may be a device configured by adding the finger touch point determining unit 30 and the disabled area setting unit 31 to the control device 5 shown in FIG. 7 or FIG. 9. FIG. 17 illustrates a block diagram obtained in a case where the finger touch point determining unit 30 and the disabled area setting unit 31 have been added to the control device 5 shown in FIG. 9.

As described above, the operation input device 100 according to the third embodiment is provided with: the finger touch point determining unit 30 for determining, by using the touch information and the determination result by the knob touch point determining unit 22, touch points corresponding to a user's finger among the plurality of touch points detected by the touch point detecting unit 21; and the disabled area setting unit 31 for setting an area in which operation input by a touch point corresponding to a user's finger is disabled, in which the disabled area setting unit 31 sets operation disabled areas that differ from each other between the state in which a user's finger is in contact with the knob 4 and a state in which a user's finger is not in contact with the knob 4. Consequently, in a state in which the user is grasping the knob 4, an operation disabled area around the knob 4 is made larger, which can suppress occurrence of operation input that is not intended by the user. Meanwhile, in a state in which the user is not grasping the knob 4, the operation disabled area around the knob 4 is made smaller, which can utilize also a display region around the knob 4 as an operation enabled area.

Furthermore, the operation input device 100 according to the third embodiment is provided with the display control unit 26 for causing an image corresponding to an operation disabled area (disabled area image) to be displayed on a display region. This enables the user to visually grasp the operation disabled area.

Fourth Embodiment

Figure 18A:
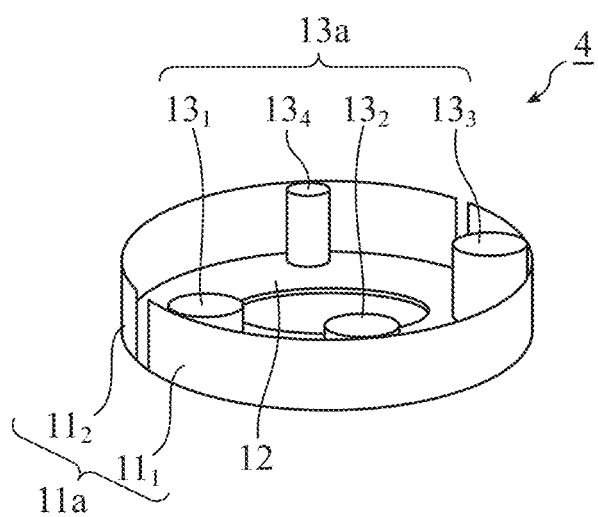
FIG. 18A is a perspective view illustrating an essential part of a knob according to a fourth embodiment of the present invention.
Figure 18B:
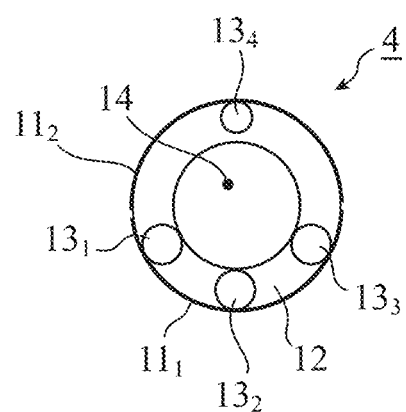
FIG. 18B is a plan view illustrating the essential part of the knob according to the fourth embodiment of the present invention.
Figure 19:
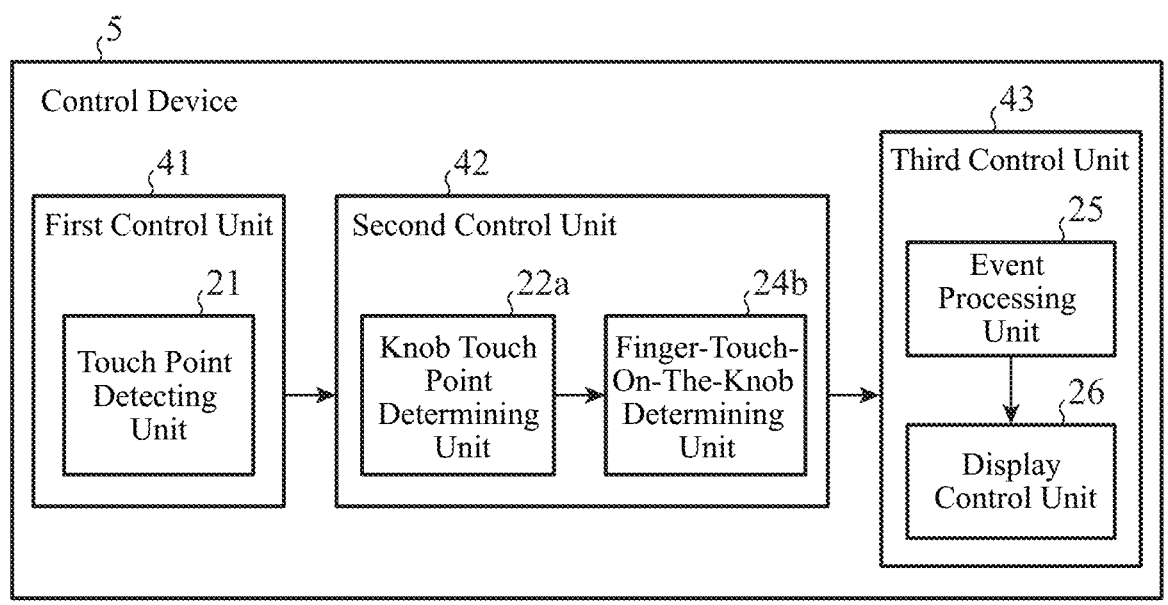
FIG. 19 is a block diagram illustrating an essential part of a control device according to the fourth embodiment of the present invention.

FIG. 18A is a perspective view illustrating an essential part of a knob according to a fourth embodiment. FIG. 18B is a plan view illustrating the essential part of the knob according to the fourth embodiment. FIG. 19 is a block diagram illustrating an essential part of a control device according to the fourth embodiment. An operation input device 100 according to the fourth embodiment will be described with reference to FIGS. 18 and 19.

It should be noted that a hardware configuration of the operation input device 100 according to the fourth embodiment is similar to that described with reference to FIG. 1 in the first embodiment, and therefore FIG. 1 is cited, and the explanation of the hardware configuration will be omitted. In addition, in FIG. 18, identical reference numerals are given to components that are similar to those shown in FIG. 2, and the explanation thereof will be omitted. Moreover, in FIG. 19, identical reference numerals are given to blocks that are similar to those shown in FIG. 3, and the explanation thereof will be omitted.

In an example shown in FIG. 18, an outer peripheral conductive portion 11a is divided into two substantially semi-cylindrical conductive portions $11_1$, $11_2$. A conductor column 13a includes: three conductor columns $13_1$ to $13_3$ (hereinafter may be referred to as "first conductor columns") that are electrically continuous to one conductive portion $11_1$; and one conductor column $13_4$ (hereinafter may be referred to as "second conductor column") that is electrically continuous to the other conductive portion $11_2$.

Here, each of the first conductor columns $13_1$ to $13_3$ has the area of the base that is large enough to be detected as a touch point irrespective of whether or not the conductive portion $11_1$ is in a state of being touched with user's finger. Meanwhile, the area of the base of the second conductor column $13_4$ is smaller than the area of the base of each of the first conductor columns $13_1$ to $13_3$, and at the same time, the second conductor column $13_4$ is not electrically continuous to the first conductor columns $13_1$ to $13_3$. Accordingly, the second conductor column $13_4$ is adapted to be detected as a touch point only in a state in which a user's finger is in a state of being in contact with the conductive portion $11_2$.

In other words, in a state in which the user is not grasping the knob 4, no user's finger is in contact with the conductive portion $11_2$, and therefore only the three conductor columns $13_1$ to $13_3$ among four conductor columns $13_1$ to $13_4$ are detected as touch points. Meanwhile, in a state in which the user is grasping the knob 4, a user's finger is in contact with the conductive portion $11_2$, and therefore all of the four conductor columns $13_1$ to $13_4$ are detected as touch points.

A knob touch point determining unit 22a determines touch points corresponding to the conductor columns 13a among a plurality of touch points detected by the touch point detecting unit 21.

Specifically, for example, the memory 7 stores beforehand, for example, information indicating a value range based on a radius of the knob 4±a predetermined allowable error (hereinafter, referred to as "radius information"), and information indicating positional relationship of the conductor columns $13_1$ to $13_4$ in the knob 4. In addition, the knob touch point determining unit 22a has a function of causing the memory 7 to store information indicating a history of determination results by the knob touch point determining unit 22a (hereinafter, referred to as "history information"). The knob touch point determining unit 22a estimates a position of a central portion of the knob 4 in a display region of the touch display 1 by using the touch information and the history information. The knob touch point determining unit 22a determines that touch points located within a circle, the center of which is the estimated central portion, and the radius of which is a value indicated by the radius information, are touch points corresponding to the conductor columns 13a.

A finger-touch-on-the-knob determining unit 24b determines, on the basis of the number of touch points included in the determination result by the knob touch point determining unit 22a, whether or not the knob 4 is in a state of being touched with user's finger. In addition, on the basis of an increase or decrease of the number of touch points, the finger-touch-on-the-knob determining unit 24b detects that a user's finger has come in contact with the knob 4, and that the user's finger has moved away from the knob 4.

Specifically, for example, in a case where the number of touch points included in the determination result by the knob touch point determining unit 22a is four, the finger-touch-on-the-knob determining unit 24b determines that a user's finger is in a state of being in contact with the knob 4. In a case where the number of touch points included in the determination result by the knob touch point determining unit 22a is three, the finger-touch-on-the-knob determining unit 24b determines that a user's finger is in a state of not being in contact with the knob 4.

In addition, for example, when the number of touch points included in the determination result by the knob touch point determining unit 22a has increased to four, from three, the finger-touch-on-the-knob determining unit 24b detects that a user's finger has come in contact with the knob 4. When the number of touch points included in the determination result by the knob touch point determining unit 22a has decreased to three, from four, the finger-touch-on-the-knob determining unit 24b detects that the user's finger has moved away from the knob 4.

Figure 20:
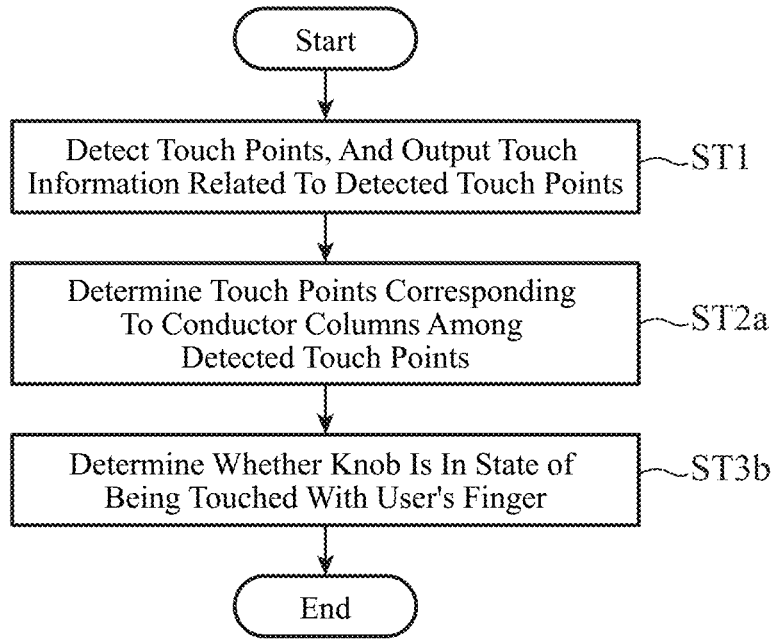
FIG. 20 is a flowchart illustrating operation of the control device according to the fourth embodiment of the present invention.

Next, operation of the control device 5 according to the fourth embodiment will be described focusing on operation of the first control unit 41 and operation of the second control unit 42 with reference to the flowchart shown in FIG. 20.

First of all, the touch point detecting unit 21 executes processing of step ST1. Processing contents of step ST1 are similar to those described with reference to FIG. 4 in the first embodiment, and therefore the explanation thereof will be omitted.

Next, in step ST2a, the knob touch point determining unit 22a determines touch points corresponding to the conductor columns 13a among a plurality of touch points detected by the touch point detecting unit 21. The specific example of the determination method by the knob touch point determining unit 22a has been described above.

Next, in step ST3b, the finger-touch-on-the-knob determining unit 24b determines, on the basis of the number of touch points included in the determination result by the knob touch point determining unit 22a, whether or not the knob 4 is in a state of being touched with user's finger. In addition, on the basis of an increase or decrease of the number of touch points, the finger-touch-on-the-knob determining unit 24b detects that a user's finger has come in contact with the knob 4, and that the user's finger has moved away from the knob 4. Specific examples of the determination method and the detection method by the finger-touch-on-the-knob determining unit 24b have been described above.

In this manner, by making a determination on the basis of the number of touch points, robustness against disturbance noises can be enhanced in comparison with the configuration in which a determination is made by using touch strength values (that is to say, the configuration of the first embodiment), and the configuration in which a determination is made on the basis of changes in touch coordinate values with respect to the time (that is to say, the configuration of the second embodiment). As the result, stable determination can be implemented even in an environment in which disturbance noises are large.

Figure 21A:
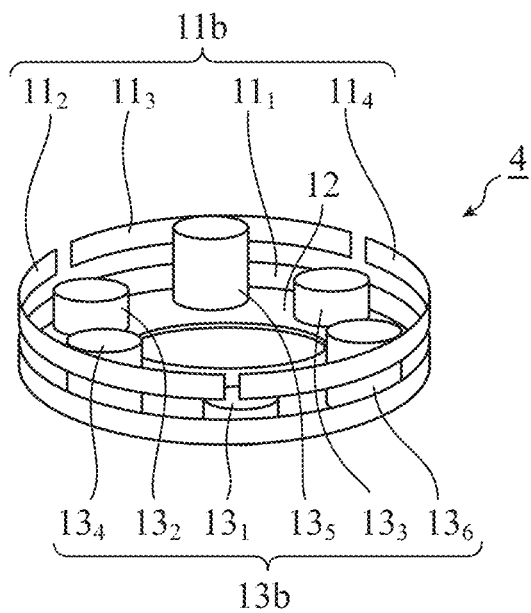
FIG. 21A is a perspective view illustrating an essential part of another knob according to the fourth embodiment of the present invention.
Figure 21B:
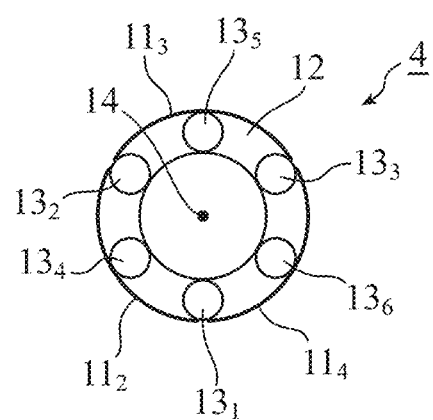
FIG. 21B is a plan view illustrating the essential part of another knob according to the fourth embodiment of the present invention.

Incidentally, with respect to the knob 4 having the structure shown in FIG. 18, depending on a state of being grasped by the user, there is also a possibility that a user's finger will not come in contact with the conductive portion $11_2$, and when the knob 4 has been grasped, the number of touch points will not increase. FIG. 21 illustrates an example of the knob 4 that has been improved on this point, in other words, the knob 4 that is adapted to increase the number of touch points irrespective of a state of being grasped.

In an example shown in FIG. 21, a substantially cylindrical outer peripheral conductive portion 11b includes a conductive portion $11_1$ corresponding to a lower half part of the cylinder; and conductive portions $11_2$ to $11_4$ corresponding to respective parts obtained by dividing an upper half part of the cylinder substantially into three parts.

A conductor column 13b includes three conductor columns $13_1$ to $13_3$ (hereinafter may be referred to as "first conductor columns") that are electrically continuous to the conductive portion $11_1$ of the lower half part. The first conductor columns $13_1$ to $13_3$ are lower in height than the undermentioned second conductor columns $13_4$ to $13_6$, and they are not electrically continuous to the conductive portions $11_2$ to $11_4$ of the upper half part.

In addition, the conductor column 13b includes three conductor columns $13_4$ to $13_6$ (hereinafter may be referred to as "second conductor columns") that are electrically continuous to the three conductive portions $11_2$ to $11_4$ respectively. In other words, the second conductor column $13_4$ is electrically continuous to the conductive portion $11_2$; the second conductor column $13_5$ is electrically continuous to the conductive portion $11_3$; and the second conductor column $13_6$ is electrically continuous to the conductive portion $11_4$. Each of the second conductor columns $13_4$ to $13_6$ is not electrically continuous to the conductive portion $11_1$ of the lower half part.

In such a structure, the three first conductor columns $13_1$ to $13_3$ are detected as touch points irrespective of whether or not the conductive portion $11_1$ is in a state of being touched with user's finger. One second conductor column $13_4$ is detected as a touch point only in a state in which a user's finger is in contact with the conductive portion $11_2$. One second conductor column $13_5$ is detected as a touch point only in a state in which a user's finger is in contact with the conductive portion $11_3$. One second conductor column $13_6$ is detected as a touch point only in a state in which a user's finger is in contact with the conductive portion $11_4$.

In this case, for example, the determination result by the knob touch point determining unit 22a in a state in which the user is not grasping the knob 4 includes three touch points corresponding to the three first conductor columns $13_1$ to $13_3$. Meanwhile, not only the three touch points, but also touch points, the number of which corresponds to the number of conductive portions with which user's fingers are in contact, among the three conductive portions $11_2$ to $11_4$, are added to the determination result by the knob touch point determining unit 22a in a state in which the user is grasping the knob 4.

Here, the number of conductive portions with which user's fingers are in contact, among the three conductive portions $11_2$ to $11_4$, differs depending on a state of grasping the knob 4 by the user (for example, the number of fingers used for grasping, etc.). In other words, the knob 4 has a structure in which the number of touch points included in the determination result by the knob touch point determining unit 22a differs depending on a state of being grasped by the user. This makes also possible to determine, on the basis of the number of touch points, a state of grasping the knob 4 by the user.

For example, in a case where the number of added touch points is less than two, the operation input is prevented from being processed as an event, which can suppress occurrence of operation input that is not intended by the user. In other words, in a case where user's fingers are in contact with the knob 4 from two or more directions, there is a high probability that the user would be grasping the knob 4 with the intention of performing operation input. Meanwhile, in a case where a user's finger comes in contact with the knob 4 only from one direction, there is a possibility that the user would not have an intention of performing operation input, in other words, there is a possibility that the contact would have been accidentally made. Therefore, by adapting the event processing unit 25 to process the former contact as an event, and not to process the latter contact as an event, occurrence of operation input that is not intended by the user can be suppressed.

It should be noted that the knob 4 may have a structure that is vertically reversed with respect to the example shown in FIG. 21. In other words, in the example shown in FIG. 21, the upper half part of the outer peripheral conductive portion is divided into the plurality of conductive portions, and these conductive portions are each electrically continuous to the plurality of second conductor columns. Meanwhile, the knob 4 may have a structure in which the lower half part of the outer peripheral conductive portion is divided into a plurality of conductive portions, and these conductive portions are each electrically continuous to the plurality of second conductor columns. Consequently, when user's fingers have come in contact with the knob 4, the number of touch points increases, which can determine whether or not the user has grasped the knob 4 firmly up to a root part. In addition, in this case, by setting operation disabled areas similar to those described with reference to FIG. 14 in the third embodiment, operation input that is not intended by the user can be prevented from occurring.

Figure 22:
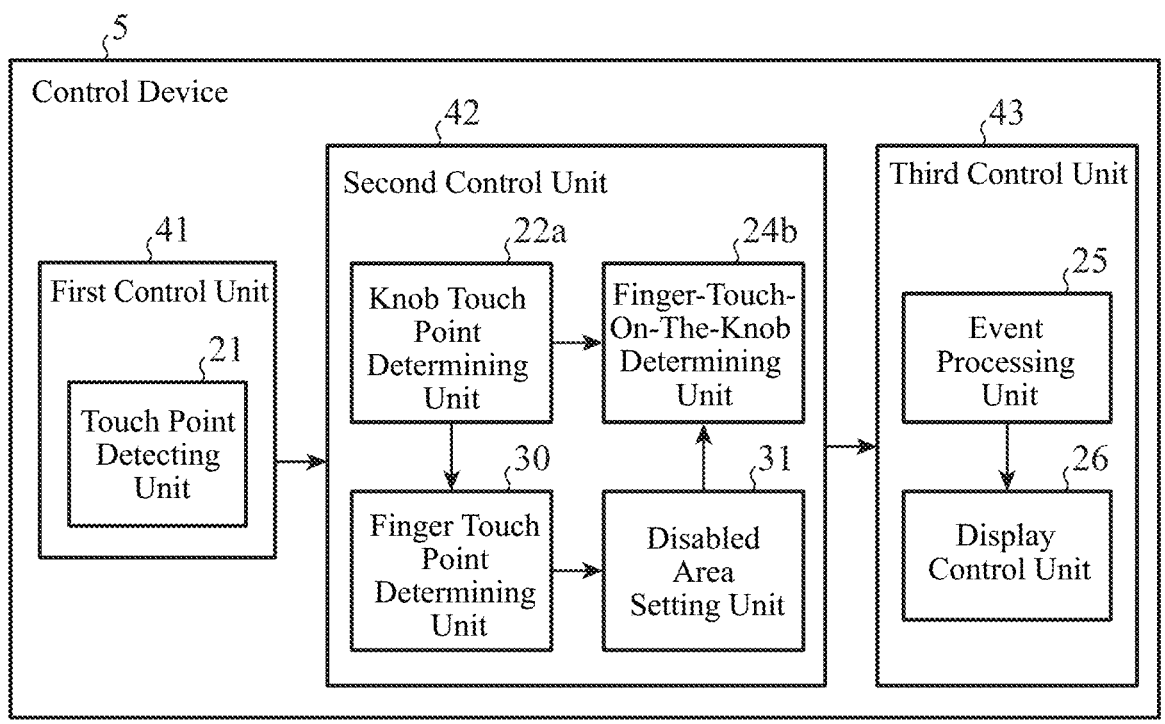
FIG. 22 is a block diagram illustrating an essential part of another control device according to the fourth embodiment of the present invention.

In other words, the finger touch point determining unit 30 and the disabled area setting unit 31 may be added to the control device 5 shown in FIG. 19. A block diagram used in this case is shown in FIG. 22.

In addition, the number of divisions of the upper half part or lower half part of the outer peripheral conductive portion is not limited to three, and the number of second conductor columns is not limited to three, either. In other words, the maximum value of the number of touch points increased when the user has grasped the knob 4 is not limited to three. By making such maximum value larger, a state of grasping the knob 4 can be determined in more detail.

As described above, the operation input device 100 according to the fourth embodiment is provided with: the knob 4 for operations, disposed in a display region of the touch display 1; conductor columns 13a, 13b each provided in the knob 4, and each including a first conductor column that can be detected as a touch point irrespective of whether or not the knob 4 is in a state of being touched with user's finger, and a second conductor column that can be detected as a touch point only in a state in which a user's finger is in contact with the knob 4; the touch point detecting unit 21 that detects a plurality of touch points including the touch points corresponding to the conductor columns 13a, 13b, and that outputs touch information related to the plurality of detected touch points; the knob touch point determining unit 22a that determines, by using the touch information, touch points corresponding to the conductor columns 13a, 13b among the plurality of touch points detected by the touch point detecting unit 21; and the finger-touch-on-the-knob determining unit 24b that determines, on the basis of the number of touch points included in the determination result by the knob touch point determining unit 22a, whether or not the knob 4 is in a state of being touched with user's finger. Consequently, the conductor columns 13a, 13b can be detected as touch points irrespective of whether or not the knob 4 is in a state of being touched with user's finger, and at the same time, whether or not the knob 4 is in a state of being touched with user's finger can be determined. In addition, even in a case where capacitance values of respective touch points are not included in the touch information output from the touch point detecting unit 21, whether or not the knob 4 is in a state of being touched with user's finger can be determined. Moreover, robustness against disturbance noises can be enhanced.

In addition, the knob 4 has a structure in which the number of touch points included in the determination result by the knob touch point determining unit 22a differs depending on a state of being grasped by the user. Employing the structure presented in FIG. 21 makes it possible to determine a state of grasping the knob 4 by the user.

It should be noted that a free combination of embodiments, or a modification of an arbitrary component of each embodiment, or an omission of an arbitrary component in each embodiment can be made in the invention of the present application within the scope of the invention.

INDUSTRIAL APPLICABILITY

The operation input device according to the present invention can be applied to an electronic device such as an in-vehicle information device.

REFERENCE SIGNS LIST

1: Touch display,
2: Display,
3: Touch sensor,
4: Knob,
5: Control device,
6: Processor,
7: Memory,
11, 11a, and 11b: Outer peripheral conductive portion,
12: Bottom plate,
13, 13a, and 13b: Conductor column,
14: Hollow portion,
21: Touch point detecting unit,
22 and 22a: Knob touch point determining unit,
23: Touch strength value calculating unit, 24, 24a, and 24b: Finger-touch-on-the-knob determining unit,
25: Event processing unit,
26: Display control unit,
27: Touch coordinate value obtaining unit,
28: Knob operation determining unit,
29: Threshold value setting unit,
30: Finger touch point determining unit,
31: Disabled area setting unit,
41: First control unit,
42: Second control unit,
43: Third control unit, and
100: Operation input device.

What is claimed is:

1. An operation input device comprising:
a knob for operations, disposed in a display region of a touch display
conductor columns that are provided in the knob, and each of which can be detected as a touch point irrespective of whether or not the knob is in a state of being touched with user's finger;
a processor to execute a program; and
a memory to store the program which, when executed by the processor, performs processes of,
detecting a plurality of touch points including the touch points corresponding to the conductor columns, and outputting touch information related to the plurality of detected touch points;
determining, by using the touch information, the touch points corresponding to the conductor columns among the plurality of touch points detected;
calculating a touch strength value on a basis of touch information of the touch points corresponding to the conductor columns by using the touch information and a determination result; and
determining, by using the touch strength value, whether or not the knob is in a state of being touched with user's finger, wherein
the processor determines, by using the touch information and the determination result, a touch point corresponding to the finger of the user among the plurality of touch points detected; and
setting an operation disabled area in which operation input by a touch point corresponding to the finger of the user is disabled,
wherein processor sets the operation disabled areas that differ from each other between the state in which the knob is being touched with user's finger and a state in which the knob is not being touched with user's finger.

2. The operation input device according to claim 1, wherein
the touch information of the touch points corresponding to the conductor columns is a total value of capacitance values of the conductor columns.

3. The operation input device according to claim 1, wherein the processor causes an image corresponding to the operation disabled area to be displayed in the display region.

4. An operation input device comprising:
a knob for operations, disposed in a display region of a touch display;
a conductor column that is provided in the knob, and that can be detected as a touch point irrespective of whether or not the knob is in a state of being touched with user's finger;
a processor to execute a program; and
a memory to store the program which, when executed by the processor, performs processes of,
detecting a plurality of touch points including the touch point corresponding to the conductor column, and outputting touch information related to the plurality of detected touch points;
determining, by using the touch information, the touch point corresponding to the conductor column among the plurality of touch points detected;
calculating a touch strength value at the touch point corresponding to the conductor column by using the touch information and a determination result;
obtaining touch coordinate values of the touch point corresponding to the conductor column by using the touch information and the determination result;
determining, on a basis of changes in the touch coordinate values with respect to time, whether or not the knob is in a state of being operated;
determining, by executing threshold-value determination processing in which the touch strength value is used, whether or not the knob is in a state of being touched with user's finger; and
setting a threshold value in the threshold-value determination processing by using the touch strength value obtained in the state in which the knob is being operated,
wherein the processor determines, by using the touch information and the determination result, a touch point corresponding to the finger of the user among the plurality of touch points detected; and
setting an operation disabled area in which operation input by a touch point corresponding to the finger of the user is disabled,
wherein processor sets the operation disabled areas that differ from each other between the state in which the knob is being touched with user's finger and a state in which the knob is not being touched with user's finger.

5. An operation input device comprising:
a knob for operations, disposed in a display region of a touch display;
a conductor column that is provided in the knob, and that can be detected as a touch point irrespective of whether or not the knob is in a state of being touched with user's finger;
a processor to execute a program; and
a memory to store the program which, when executed by the processor, performs processes of,
detecting a plurality of touch points including the touch point corresponding to the conductor column, and outputting touch information related to the plurality of detected touch points;
determining, by using the touch information, the touch point corresponding to the conductor column among the plurality of touch points detected;
calculating a touch strength value at the touch point corresponding to the conductor column by using the touch information and a determination result;
obtaining touch coordinate values of the touch point corresponding to the conductor column by using the touch information and the determination result;
determining, on a basis of changes in the touch coordinate values with respect to time, whether or not the knob is in a state of being operated;
determining, by executing threshold-value determination processing in which the touch strength value is used, whether or not the knob is in a state of being touched with user's finger; and setting a threshold value in the threshold-value determination processing by using the touch strength value obtained in the state in which the knob is being operated, wherein when the determination result indicating that the touch strength value is lower than the threshold value, or lower than or equal to the threshold value, is obtained a reference number of times in succession in the threshold-value determination processing, the processor settles the determination result.

6. The operation input device according to claim 5, wherein the processor determines, by using the touch information and the determination result by the knob touch point determining unit, a touch point corresponding to the finger of the user among the plurality of touch points detected by the touch point detecting unit; and sets an operation disabled area in which operation input by a touch point corresponding to the finger of the user is disabled, wherein the processor sets the operation disabled areas that differ from each other between the state in which the knob is being touched with user's finger and a state in which the knob is not being touched with user's finger.

7. An operation input device comprising:

a knob for operations, disposed in a display region of a touch display;

a conductor column that is provided in the knob, and that can be detected as a touch point irrespective of whether or not the knob is in a state of being touched with user's finger;

a processor to execute a program; and a memory to store the program which, when executed by the processor, performs processes of, detecting a plurality of touch points including the touch point corresponding to the conductor column, and outputting touch information related to the plurality of detected touch points;

determining, by using the touch information, the touch point corresponding to the conductor column among the plurality of touch points detected;

obtaining touch coordinate values of the touch point corresponding to the conductor column by using the touch information and a determination result; and determining, on a basis of changes in the touch coordinate values with respect to time, whether or not the knob is in a state of being touched with user's finger, by calculating amounts of changes in the touch coordinate values with respect to the time, obtaining estimated values of difference values between the touch coordinate values in the state in which the knob is being touched with user's finger and the touch coordinate values in a state in which the knob is being touched with user's finger, and comparing values of the amounts of changes with the estimated values to determine whether or not the knob is being touched with user's finger.

8. The operation input device according to claim 7, wherein the processor calculates amounts of changes in the touch coordinate values over a reference time and executes threshold-value determining processing in which values of the amounts of changes are used to determine whether or not the knob is being touched with user's finger.

9. The operation input device according to claim 8, wherein the processor determines, by using the touch information and the determination result by the knob touch point determining unit, a touch point corresponding to the finger of the user among the plurality of touch points detected by the touch point detecting unit; and sets an operation disabled area in which operation input by a touch point corresponding to the finger of the user is disabled, wherein the processor sets the operation disabled areas that differ from each other between the state in which the knob is being touched with user's finger and a state in which the knob is not being touched with user's finger.

10. The operation input device according to claim 7, wherein the processor determines, by using the touch information and the determination result by the knob touch point determining unit, a touch point corresponding to the finger of the user among the plurality of touch points detected by the touch point detecting unit; and sets an operation disabled area in which operation input by a touch point corresponding to the finger of the user is disabled, wherein the processor sets the operation disabled areas that differ from each other between the state in which the knob is being touched with user's finger and a state in which the knob is not being touched with user's finger.

11. An operation input device comprising:

a knob for operations, disposed in a display region of a touch display;

a conductor column provided in the knob, and each including a first conductor column that can be detected as a touch point irrespective of whether or not the knob is in a state of being touched with user's finger, and a second conductor column that can be detected as a touch point only in the state in which the knob is being touched with user's finger;

a processor to execute a program; and a memory to store the program which, when executed by the processor, performs processes of, detecting a plurality of touch points including the touch point corresponding to the conductor column, and outputting touch information related to the plurality of detected touch points;

determining, by using the touch information, the touch point corresponding to the conductor column among the plurality of touch points detected; and determining, on a basis of the number of touch points included in a determination result, whether or not the knob is in a state of being touched with user's finger, wherein the knob has a structure in which the number of touch points included in the determination result differs depending on a state of being grasped by the user.

12. The operation input device according to claim 11, wherein the processor determines, by using the touch information and the determination result by the knob touch point determining unit, a touch point corresponding to the finger of the user among the plurality of touch points detected; and sets an operation disabled area in which operation input by a touch point corresponding to the finger of the user is disabled, wherein the processor sets the operation disabled areas that differ from each other between the state in which the knob is being touched with user's finger and a state in which the knob is not being touched with user's finger.

13. An operation input device comprising:
a knob for operations, disposed in a display region of a touch display;
a conductor column that is provided in the knob, and that can be detected as a touch point irrespective of whether or not the knob is in a state of being touched with user's finger;
a processor to execute a program; and
a memory to store the program which, when executed by the processor, performs processes of,
detecting a plurality of touch points including the touch point corresponding to the conductor column, and outputting touch information related to the plurality of detected touch points;
determining, by using the touch information, the touch point corresponding to the conductor column among the plurality of touch points detected;
calculating a touch strength value at the touch point corresponding to the conductor column by using the touch information and a determination result;
determining, by using the touch strength value, whether or not the knob is in a state of being touched with user's finger;
determining, by using the touch information and the determination result, a touch point corresponding to the finger of the user among the plurality of touch points detected; and
setting an operation disabled area in which operation input by a touch point corresponding to the finger of the user is disabled, so that the operation disabled areas differ from each other between the state in which the knob is being touched with user's finger and a state in which the knob is not being touched with user's finger.

14. The operation input device according to claim 13, wherein the processor causes an image corresponding to the operation disabled area to be displayed in the display region.

* * * * *